United States Patent
Deliwala

(10) Patent No.: US 12,458,260 B1
(45) Date of Patent: Nov. 4, 2025

(54) ELECTRONIC ARCHITECTURE FOR CODED LIGHT TARGET ANALYSIS

(71) Applicant: Emcode Photonics LLC, Andover, MA (US)

(72) Inventor: Shrenik Deliwala, Andover, MA (US)

(73) Assignee: Emcode Photonics LLC, Andover, MA (US)

( * ) Notice: Subject to any disclaimer, the term of this patent is extended or adjusted under 35 U.S.C. 154(b) by 0 days.

(21) Appl. No.: 18/929,298

(22) Filed: Oct. 28, 2024

(51) Int. Cl.
*G06V 10/143* (2022.01)
*A61B 5/00* (2006.01)
(Continued)

(52) U.S. Cl.
CPC .......... *A61B 5/1455* (2013.01); *A61B 5/7203* (2013.01); *A61B 5/7225* (2013.01); *A61B 5/01* (2013.01); *A61B 2562/0233* (2013.01)

(58) Field of Classification Search
CPC ............... G01D 5/35316; G01N 15/06; G01N 2015/0693; G01N 2015/0046; G01N 2021/3144; G01N 21/255; G01N 21/31; G01N 21/3504; G01N 21/4795; G01N 21/61; G01N 21/8806; G01N 21/8851; G01N 21/9501; G02B 6/0208; G02B 6/02138; G02B 6/29319; G02B 6/4215; G02B 6/4231; G08B 17/107; G08B 17/113; G08B 17/103; H01L 31/167; A61B 2560/0209; A61B 2562/0238;
(Continued)

(56) References Cited

U.S. PATENT DOCUMENTS

| 7,265,830 B2 | 9/2007 | Wang |
| 7,339,170 B2 | 3/2008 | Deliwala |

(Continued)

FOREIGN PATENT DOCUMENTS

| CN | 117561426 A | 2/2024 |
| DE | 102010053978 A1 | 6/2012 |

(Continued)

OTHER PUBLICATIONS

U.S. Appl. No. 18/045,695 U.S. Pat. No. 11,704,886, filed Oct. 11, 2022, Coded Light for Target Imaging or Spectroscopic or Other Analysis.

(Continued)

*Primary Examiner* — Michael J Vanchy, Jr.
(74) *Attorney, Agent, or Firm* — Schwegman Lundberg & Woessner, P.A.

(57) ABSTRACT

An electronic interface device is configured for use with associated optics for employing coded light for illuminating a liquid, gaseous, or other analyte or target, such as for measuring or determining a composition or other property of the analyte or target. The arrangement can help enable a far higher level of performance, such as for spectral analysis, imaging, or both. A shared common clock on both the illumination and receive sides of the system can be included, such as together with one or more of reference detection, per-channel wavelength-dependent modulation, multiple concurrent feedback loops at different levels, orthogonal and circulant codes, phase-scrambling to better utilize ADC dynamic range, oversampling, and other signal processing can be provided.

30 Claims, 21 Drawing Sheets

(51) Int. Cl.
*A61B 5/1455* (2006.01)
*G06V 10/141* (2022.01)
*A61B 5/01* (2006.01)

(58) Field of Classification Search
CPC ............ A61B 2562/043; A61B 5/0205; A61B 5/02422; A61B 5/14551; A61B 5/14552; A61B 5/6826; A61B 5/6843; A61B 5/0075; A61B 5/742; G01B 11/2509; G01B 9/02091; G01J 2003/104; G01J 2003/4332; G01J 2003/4334; G01J 3/2803; G01J 3/2823; G01J 3/42; G01J 3/427; G01J 3/433; G06V 10/141; G06V 10/143
See application file for complete search history.

(56) References Cited

U.S. PATENT DOCUMENTS

| | | |
|---|---|---|
| 9,130,070 B2 | 9/2015 | Deliwala et al. |
| 9,341,565 B2 | 5/2016 | Lamego et al. |
| 10,056,868 B2 | 8/2018 | Deliwala et al. |
| 10,066,977 B2 | 9/2018 | Hasson et al. |
| RE48,996 E | 3/2022 | Deliwala et al. |
| 11,704,886 B2 | 7/2023 | Deliwala |
| 12,165,372 B2 | 12/2024 | Deliwala |
| 12,307,731 B2 | 5/2025 | Deliwala |
| 2002/0001080 A1 | 1/2002 | Miller et al. |
| 2005/0270528 A1 | 12/2005 | Geshwind et al. |
| 2005/0286049 A1 | 12/2005 | Hagler |
| 2007/0093717 A1 | 4/2007 | Nagar et al. |
| 2007/0296969 A1 | 12/2007 | Goldstein et al. |
| 2010/0008588 A1 | 1/2010 | Feldkhun et al. |
| 2010/0056928 A1 | 3/2010 | Zuzak et al. |
| 2012/0080611 A1 | 4/2012 | Jones et al. |
| 2012/0248985 A1 | 10/2012 | Lin et al. |
| 2012/0307081 A1 | 12/2012 | Dewald et al. |
| 2014/0233028 A1 | 8/2014 | Englund |
| 2015/0241003 A1 | 8/2015 | Ikami |
| 2017/0059408 A1 | 3/2017 | Körner et al. |
| 2017/0164848 A1 | 6/2017 | Nadeau et al. |
| 2018/0136042 A1 | 5/2018 | Goldring et al. |
| 2019/0150839 A1 | 5/2019 | Kurfiss et al. |
| 2020/0011734 A1* | 1/2020 | Lee ............... G01J 3/18 |
| 2022/0163634 A1 | 5/2022 | Gorman et al. |
| 2023/0041114 A1 | 2/2023 | Seider et al. |
| 2023/0108409 A1* | 4/2023 | Deliwala ............ G01N 21/255 382/128 |
| 2023/0113897 A1 | 4/2023 | Deliwala |
| 2024/0362883 A1 | 10/2024 | Deliwala |

FOREIGN PATENT DOCUMENTS

| | | |
|---|---|---|
| IN | 202317058208 A | 12/2023 |
| WO | WO-2022182747 A2 | 9/2022 |
| WO | WO-2022182747 A3 | 9/2022 |

OTHER PUBLICATIONS

U.S. Appl. No. 18/045,701, filed Oct. 11, 2022, Coded LED or Other Light for Target Imaging or Analysis.
U.S. Appl. No. 18/751,080, filed Jun. 21, 2024, Wearable Device Providing Glucose Measurement.
U.S. Appl. No. 18/886,840, filed Sep. 16, 2024, Multiple Input Spectrometer.
"U.S. Appl. No. 18/045,695, Notice of Allowance mailed Feb. 16, 2023", 10 pgs.
"U.S. Appl. No. 18/045,701, 312 Amendment filed Oct. 7, 2024", 18 pgs.
"U.S. Appl. No. 18/045,701, Advisory Action mailed Nov. 15, 2023", 3 pgs.
"U.S. Appl. No. 18/045,701, Corrected Notice of Allowability mailed Oct. 11, 2024", 4 pgs.
"U.S. Appl. No. 18/045,701, Examiner Interview Summary mailed Apr. 9, 2024", 2 pgs.
"U.S. Appl. No. 18/045,701, Examiner Interview Summary mailed Jun. 28, 2023", 2 pgs.
"U.S. Appl. No. 18/045,701, Final Office Action mailed Aug. 31, 2023", 40 pgs.
"U.S. Appl. No. 18/045,701, Non Final Office Action mailed Feb. 29, 2024", 43 pgs.
"U.S. Appl. No. 18/045,701, Non Final Office Action mailed Mar. 31, 2023", 28 pgs.
"U.S. Appl. No. 18/045,701, Notice of Allowance mailed Jul. 9, 2024", 12 pgs.
"U.S. Appl. No. 18/045,701, PTO Response to Rule 312 Communication mailed Oct. 15, 2024", 2 pgs.
"U.S. Appl. No. 18/045,701, Response filed Apr. 29, 2024 to Non Final Office Action mailed Feb. 29, 2024", 24 pgs.
"U.S. Appl. No. 18/045,701, Response filed Jun. 27, 2023 to Non Final Office Action mailed Mar. 31, 2023", 26 pgs.
"U.S. Appl. No. 18/045,701, Response filed Oct. 31, 2023 to Final Office Action mailed Aug. 31, 2023", 34 pgs.
"U.S. Appl. No. 18/045,701, Response Filed Nov. 21, 2023 to Advisory Action mailed Nov. 15, 2023", 34 pgs.
"U.S. Appl. No. 18/751,080, Non Final Office Action mailed Sep. 13, 2024", 41 pgs.
"Chinese Application Serial No. 202280023465.1, Notification to Make Rectification mailed Nov. 1, 2023", with machine translation, 3 pgs.
"Chinese Application Serial No. 202280023465.1, Response filed Jan. 8, 2024 to Notification to Make Rectification mailed Nov. 1, 2023", with machine translation, 62 pgs.
"Chinese Application Serial No. 202280023465.1, Voluntary Amendment filed May 28, 2024", with English claims, 49 pgs.
"International Application Serial No. PCT/US2022/017503, International Preliminary Report on Patentability mailed Sep. 7, 2023", 28 pgs.
"International Application Serial No. PCT/US2022/017503, International Search Report mailed Sep. 9, 2022", 8 pgs.
"International Application Serial No. PCT/US2022/017503, Invitation to Pay Additional Fees mailed May 24, 2022", 21 pgs.
"International Application Serial No. PCT/US2022/017503, Written Opinion mailed Sep. 9, 2022", 26 pgs.
Caramazza, Piergiorgio, et al., "Transmission of natural scene images through a multimode fibre", Nature Communications / https://doi.org/10.1038/s41467-019-10057-8, (2019), 1-6.
Sugimoto, Nobuo, "Hadamard transform active long-path absorption spectrometer system for measurements of atmospheric trace species", Applied Optics, vol. 25, No. 6, (Mar. 15, 1986), 863-865.
"U.S. Appl. No. 18/751,080, Response filed Dec. 13, 2024 to Non Final Office Action mailed Sep. 13, 2024", 17 pgs.
"U.S. Appl. No. 18/751,080, 312 Amendment filed Jan. 27, 2025", 10 pgs.
"U.S. Appl. No. 18/751,080, Notice of Allowance mailed Jan. 23, 2025", 14 pgs.
"U.S. Appl. No. 18/751,080, PTO Response to Rule 312 Communication mailed Apr. 7, 2025", 2 pgs.
"U.S. Appl. No. 19/038,262, Preliminary Amendment Filed May 19, 2025", 8 pgs.
"U.S. Appl. No. 18/751,080, PTO Response to Rule 312 Communication mailed Feb. 4, 2025", 2 pgs.
"U.S. Appl. No. 18/751,080, 312 Amendment filed Mar. 28, 2025", 3 pgs.

* cited by examiner

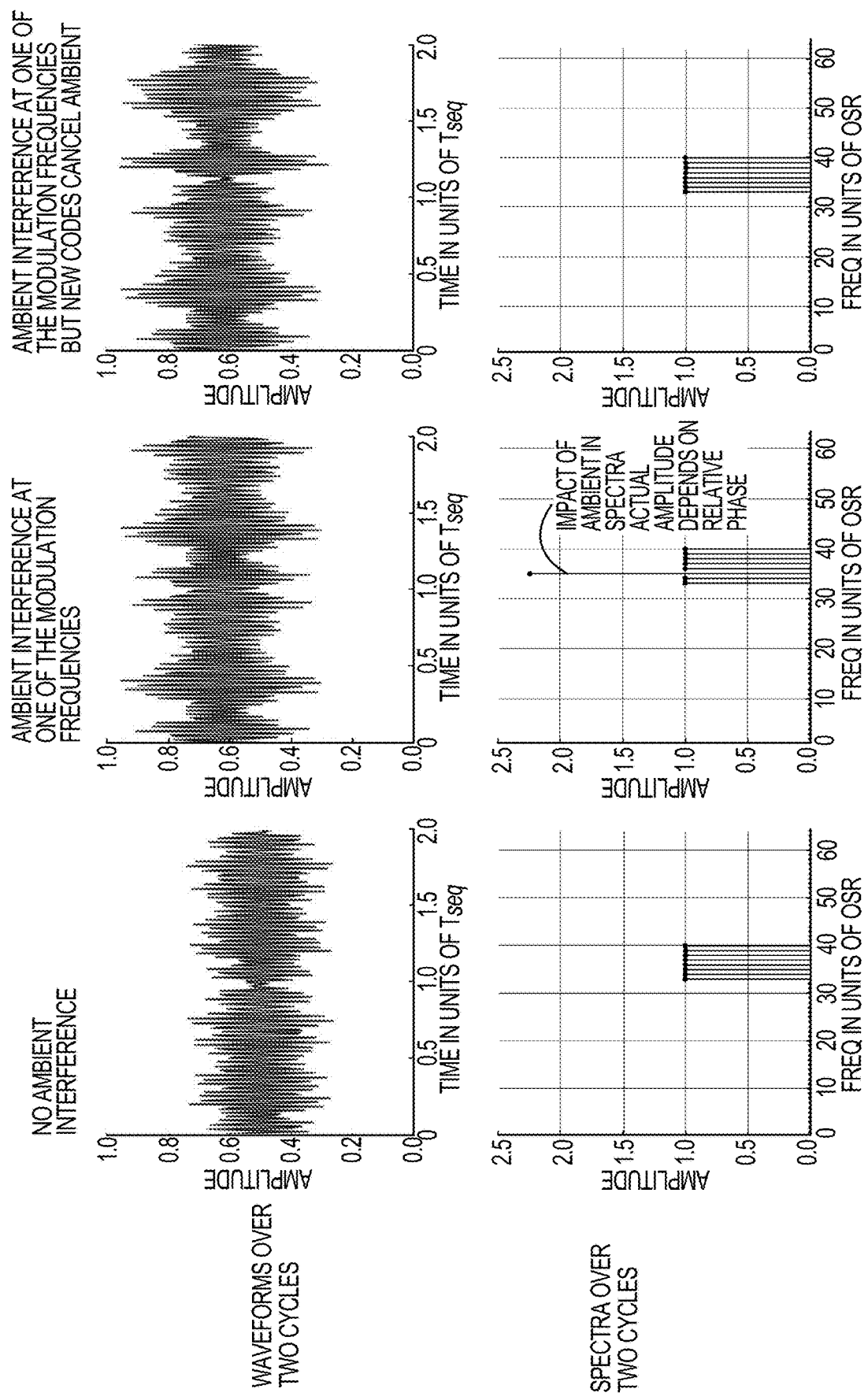

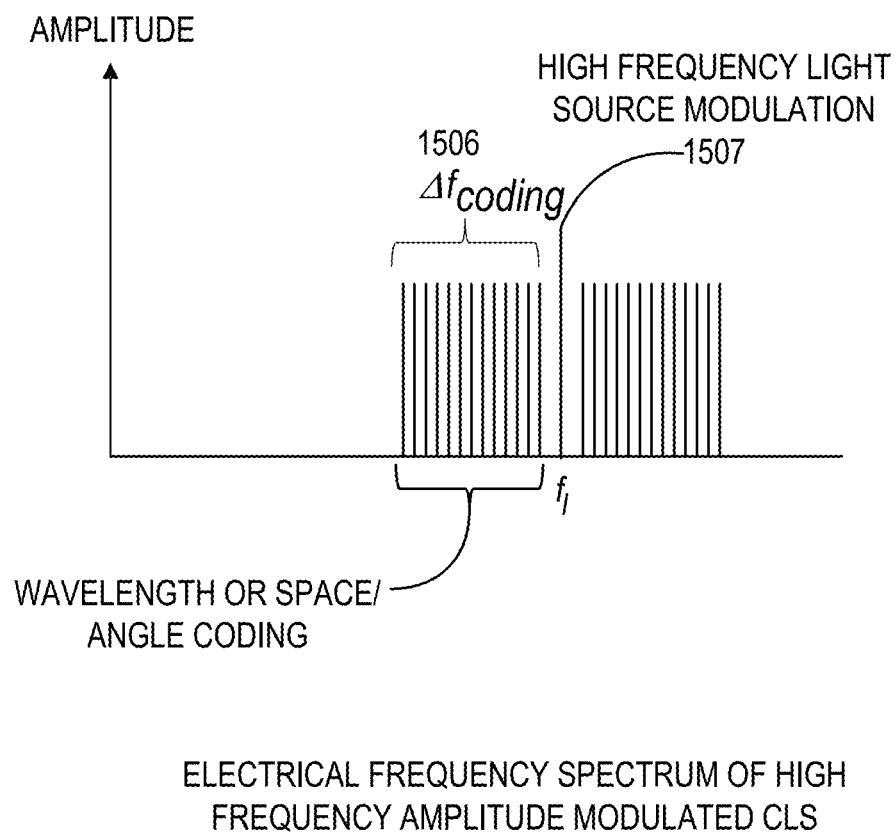
ELECTRICAL FREQUENCY SPECTRUM OF HIGH
FREQUENCY AMPLITUDE MODULATED CLS
FIG. 9 (coding)

COMPLETE FIT TO TISSUE SPECTRA WITH VERY LITTLE MOTION ARTIFACTS THAT INCLUDES HEMATOCRIT, WATER, MELANIN, SCATTERING, AND OXYGENATION

FIT TO THE ARTERIAL BLOOD SPECTRA BY "LOCKING" TO THE PPG PULSE AND MEASURING "AC/DC" OF THE PPG WAVEFORM AT EVERY SPECTRAL BIN

ELECTRONIC ARCHITECTURE FOR CODED LIGHT TARGET ANALYSIS

TECHNICAL FIELD

This document pertains generally, but not by way of limitation, to optical analysis of a target using coded light and particularly, but not by way of limitation, to an electronic architecture of an electronic interface device for optics to facilitate the same using the electronic interface device and the optics.

BACKGROUND

An object of interest can be analyzed by illuminating it with light and measuring a scattering response, which can indicate one or more material properties or constituent components of the object of the target object of interest. Even under high intensity illumination, however, a weak response may be observed from the target object, for example, such as an in vivo region of tissue in a human or animal subject. Noise from ambient light or other external interference or from the electronic componentry can be challenging to the measurement and analysis of one or more properties of interest of the target object.

SUMMARY/OVERVIEW

This document describes, among other things, an electronic interface device for use with associated optics for employing coded light for illuminating a liquid, gaseous, or other analyte or target, such as for measuring or determining a composition or other property of the analyte or target.

When paired with the appropriate optics, an electronic interface device with the CEA described herein can help enable a far higher level of performance, such as for spectral analysis, imaging, or both. As an example of a particularly challenging and useful application, the CEA and optics can be used to provide sufficient sensitivity, stability, and power efficiency to enable non-invasive detection of one or more molecules of a target analyte within the body, such as measurement of glucose or other target analyte, such as can be implemented in a smart-watch, a smart ring, or other battery-powered wearable device. In another application, the CEA and the included or accompanying optics can be used together to provide a highly sensitive measurement of environmental gases at low power. The present approach can help enable the use of low power and low-cost light sources to reach the desired level of sensitivity of the system, without requiring thermoelectrically cooling noisy photodetectors.

This Summary/Overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 7A, 7B, and 7C illustrate examples of amplitude vs. time and corresponding amplitude vs. frequency signal plots for modulation using modified sinusoidal modulation functions to provide a very good immunity to ambient light interference even when the ambient light interference frequency lies very close to or is even equal to one of the modulation frequencies.

FIG. 9 is an amplitude vs. frequency graph illustrating conceptually an example of the output spectrum of the modulated optical channels.

DETAILED DESCRIPTION

Figure 1:
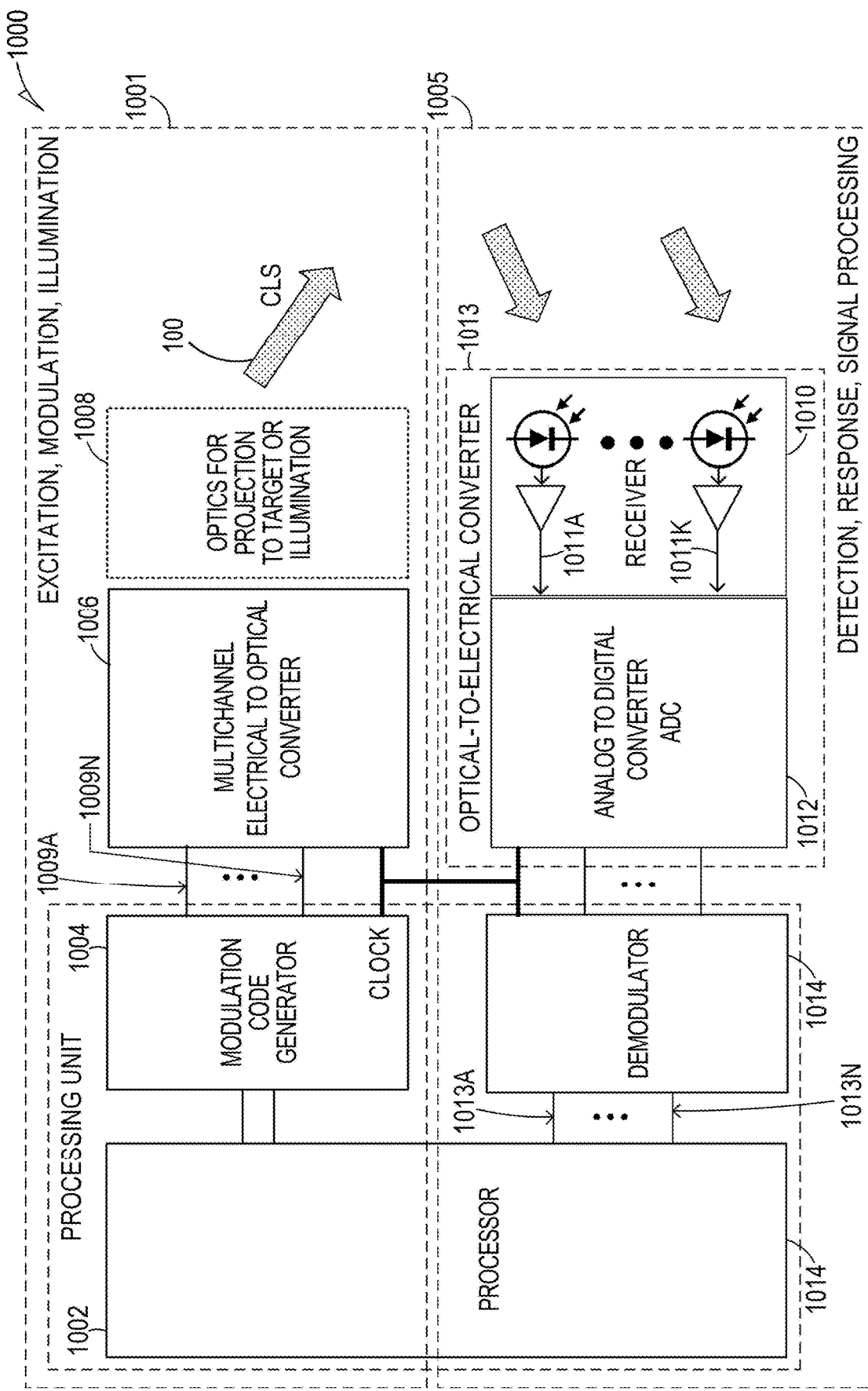
FIG. 1 is a schematic/block diagram that shows an example of portions of the present system.

This document describes, among other things, illustrative examples of an electronic architecture and accompanying optics, such as can help implement photonic functions described in Deliwala U.S. Pat. No. 11,704,886, which is hereby incorporated herein by reference in its entirety, including its description of employing coded illumination light, such as using a Wavelength Coded Light Source (W-CLS) and its description of employing a Spatially Coded Light Source (S-CLS). The electronic architecture, providing an electronic interface device, and optics coupled thereto, such as described or incorporated herein, can be helpful to help implement the electrical and computation functions useful for modulating illumination electromagnetic energy ("light") for either W-CLS or S-CLS and for analyzing light received in response to such illumination, such as to recover one or more of amplitude, phase, and spectral bin responses from the target to the coded illumination light.

As explained herein, multiple modulated light beams can be combined and projected as illumination light toward a target of interest to be analyzed. Then, a portion of the light reflected, transmitted, or scattered from the target can be received by one or more photodetectors ("detectors"). Optionally, one or more of such detectors can be configured to receive "reference" light immediately after modulation and combination—e.g., before such combined modulated light interacts with and is modified by the target. Such reference light can serve as a reference, such as for normalizing illumination control or response signal processing such that one or more effects of changes in the light source or in one or more modulation characteristics can be divided out or otherwise removed or attenuated from the response signal from the target being analyzed.

The Coded-light Electronic Architecture (CEA), described herein can provide an electrical system and electronic componentry that can be used to drive and receive coded-light signals (and corresponding electrical signals), and to provide digital signal processing functions as shown and described herein. When paired with the appropriate optics, an electronic interface device with the CEA described herein can help enable a far higher level of performance, such as for spectral analysis, imaging, or both. As an example of a particularly challenging and useful application, the CEA and optics can be used to provide sufficient sensitivity, stability, and power efficiency to enable non-invasive detection of one or more molecules of a liquid, gaseous, or other target analyte within the body, such as measurement of glucose or other target analyte, such as can be implemented in a smart-watch, a smart ring, or other battery-powered wearable device. In another application, the CEA and the included or accompanying optics can be used together to provide a highly sensitive measurement of environmental gases at low power. The present approach can help enable the use of low power and low-cost light sources to reach the desired level of sensitivity of the system, without requiring thermoelectrically cooling noisy photodetectors.

The present approach to CEA can help facilitate one or more potential advantages over one or more other approaches. First, for example, the present approach to CEA can help provide an ultra-high signal-to-noise ratio (SNR)—which can reach levels limited only by physics. The present techniques can enable providing ultra-low-noise photodetector receivers, such as which can reach shot noise limited detection at very low power levels-even in spectral regions in which photodetectors can be noisy. The present techniques can also provide a flexible choice of electronic components, such as can help reduce power and can be capable of being coupled to various photodiodes or other light transducers. The present techniques can also help provide very flexible ambient light and electronic noise rejection for different environments and applications.

As a second example, the present approach to CEA can help provide low average and peak optical power in each spectral or spatial bin being separately modulated. Thus, the present approach can help enable an ability to use light sources and modulators that are incapable of producing high peak powers. This is particularly true in longer wavelength ranges at which material properties or cost may limit the use of high peak powers.

As a third example, the present approach to CEA can help provide the ability and flexibility to limit or reject many sources of low-frequency noise, such as in photodiodes, amplifiers, light sources, or from the environment. For example, the presence of $1/f^\alpha$ noise or pink noise in a system makes it impossible to improve SNR by averaging more. In this document, sources of noise are referred to collectively as 1/f noise. Because the present approach can permit elimination or significant reduction of 1/f noise, it can allow for longer integration time of the one or more signals transduced by the corresponding one or more photodetectors to help improve the SNR. This is important in many applications in which the size of the device or lower power consumption (for battery operation) can be traded for longer integration time.

As a fourth example, the present approach to CEA can help provide the ability to make multiple measurements of a target or of different targets from a modulated optical source that can be fully synchronized in time and can be used to update the entire spectra or spatial image concurrently or simultaneously.

When electronic architecture aspects of the present approach to CEA are combined with the photonics and optics described in and herein incorporated from Deliwala U.S. Pat. No. 11,704,886, it can help enable a number of potential applications, such as, for example:

(1) Non-invasive measurement of hard-to-measure molecules, such as glucose, alcohol, and lactic acid to name a few, for which it is desirable to reach an SNR of 80 dB (or 104) or more, since such target analytes are present in the human body at the concentration of 50-100 ppm, or at the level of ~$10^{-4}$;

(2) Measurement of very low concentration of dangerous gases such as formaldehyde and others at parts per million level with very short path length, which can help make the measurement apparatus compact and cost-effective;

(3) Measurement of small, received light scattering signals, such as at a receiver that can be placed far from the target for spectral analysis (e.g., in large coating chamber or in an agricultural field) even in the presence of ambient light and other sources of ambient noise;

(4) Measurement of changes in light scattering from tissue or from one or more aerosols, such as to identify its chemical composition by spectral analysis, which can involve detecting either very small signals, small changes in the received signal, or both; and/or (5) The entire spectra or image can be measured over the same measurement window, significantly reducing any motion artifacts, which can help provide a wearable, non-invasive sensor that can avoid distortion in measured spectra.

The present approach can provide a CEA that can include or consist of multiple circuit blocks that can work together and can share a common clock to synchronize generation of illumination, reception of response light, and analysis of the received and transduced response light. Some of these circuit blocks can be located on the same electronic chip and can share certain common electronic resources such as a clock, a band-gap voltage reference, or the like.

FIG. 1 is a schematic/block diagram that shows an example of portions of the present system 1000. The system 1000 can be partitioned into: (1) an excitation, modulation, and illumination portion 1001, which can encode light with a set of modulation functions for illuminating a target object with coded light; and (2) a response detection and signal processing portion 1005, which can detect light that has interacted with the target object, transduce the detected light into one or more electrical signals, which can then be further signal-processed, such as to demodulate the one or more electrical signals representative of response light to recover and use the coded modulation functions, such as for analyzing one or more material properties of the target object.

The system 1000 can include a processing unit 1002. Portions of the processing unit 1002 can service both the excitation portion 1001 and the response detection and signal-processing portion 1005, as shown in FIG. 1. The processing unit 1002 can include a microprocessor, microcontroller, or other processor 1003 circuitry. The processor 1003 can similarly service both the excitation portion 1001 and the response detection and signal-processing portion 1005, as shown in FIG. 1. The processor 1003 can be configured to help generate one or more spectra or images of the target object.

On the excitation portion 1001 side of the system 1000, shown at the top portion of FIG. 1, the processing unit 1002 can also include a modulation code generator 1004 circuit. The modulation code generator 1004 can serve as a multi-channel electronic coded signal generator circuit. The excitation portion 1001 can also include additional signal conditioning circuitry, such as on the individual ones of the multiple excitation channels of the excitation portion 1001. The modulation code generator 1004 can provide multiple modulated excitation output signals via these respective excitation channels to corresponding electrical-to-optical modulator channels of a multi-channel electrical-to-optical converter 1006 circuit.

On the response detection and signal-processing portion 1005 of the system 1000, shown at the bottom portion of FIG. 1, the processing unit 1002 can include a multi-channel electronic demodulator 1014 circuit. The demodulator 1014 can be configured to decode the codes associated with the received and transduced response light, such as into multiple response channels, respectively corresponding to the individual excitation channels provided by the excitation portion 1001 of the system 1000. The resulting decoded multiple response channels can be further signal-processed, such as for use in determining one or more spectral characteristics from which the presence, quantity, or concentration of a liquid, gaseous, or other target analyte can be determined, such as using spectroscopic analysis that can be performed by the processor 1003.

Using such componentry and a common clock that can be shared between the excitation portion 1001 and the response detection and signal-processing portion 1005 of the system 1000, the system 1000 can perform (1) modulation encoding of light for illumination of the target and (2) demodulation of received and transduced response light (from the target or via a "reference" signal pathway that does not interact with the target). The system 1000 can also use the processing unit 1002 for combining information, such as from multiple measurement target sites, or with reference spectra (e.g., obtained using the "reference" signal pathway that does not interact with the target), and other signal-processing of the data according to the needs of a particular user or application. In many of the FIGS. herein, the processor 1003 is not shown explicitly, but it can be understood that there can be a processor 1003 that is configured to direct much of the signal-processing or signal analysis, including establishing or adjusting one or more parameter settings, such as can be employed to carry out modulation and demodulation, measurement of spectra, rate of measurement, averaging, and more.

The modulation code generator 1004 of the excitation portion 1001 of the system 1000 can include multiple "excitation" or "modulation" channels 1009A . . . 1009N. Using these excitation or modulation channels 1009, the modulation code generator 1004 can be configured to generate multiple concurrent or simultaneous digital electrical signals, each which can have a unique time-varying signature that can be used for powering and modulating illumination light on that particular modulation channel 1009. For example, for spectroscopy measurement using W-CLS, $N_\lambda$ codes can be generated, one for each wavelength bin on its individual modulation channel 1009 whose response is to be measured in response to illumination light combining the modulated light of the various modulation channels 1009. For spatial measurements using S-CLS, $N_s$ modulation codes ("codes") can be generated via corresponding modulation channels 1009, and the illumination light can be projected at $N_s$ different angles, such as to create a spatial image. Some illustrative examples of modulation codes are described herein, such as modified circulant codes or non-binary codes such as modified sine and cosine codes. One characteristic of the modulation codes can be that the mathematical sum of these codes will produce a periodic repeating time-varying sequence that defines a modulation code period $T_{seq}$, which would repeat at repetition rate $R=1/T_{seq}$. All the modulation code generator 1004 output signals on the respective modulation channels 1009 can employ time-varying codes that have the same length N_T ($N_T$) and that are synchronized to the common clock shared by the excitation portion 1001 and the response detection and signal processing 1005 portion of the system 1000 and its processing unit 1002.

A digital-to-analog converter (DAC) 2000 can be provided in the modulation code generator 1004 or in the multi-channel electrical-to-optical converter 1006. The DAC 2000 can be configured to receive as inputs the digital excitation modulation code signals corresponding to the different modulation channels 1009, and to convert these digital modulation code signals into analog signals to impress the corresponding modulation codes to respective $N_\lambda$ or $N_s$ modulation channels 1009 of the multi-channel electrical-to-optical converter 1006. The DAC 2000 can help shape, amplify, and convert to an appropriate voltage or current needed by a particular modulation channel's 1009 electrical-to-optical converter component 2006A . . . 2006N to produce the desired optical illumination output corresponding to that modulation channel 1009. The electrical-to-optical converter component 2006 of an individual modulation channel 1009 can include a light-emitting diode (LED), a super luminescent LED (SLED), or other light-producing or light-modulating electrical-to-optical converter component 2006 that can be respectively provided for each modulation channel 1009 of the multi-channel electrical-to-optical converter 1006.

Figure 3:
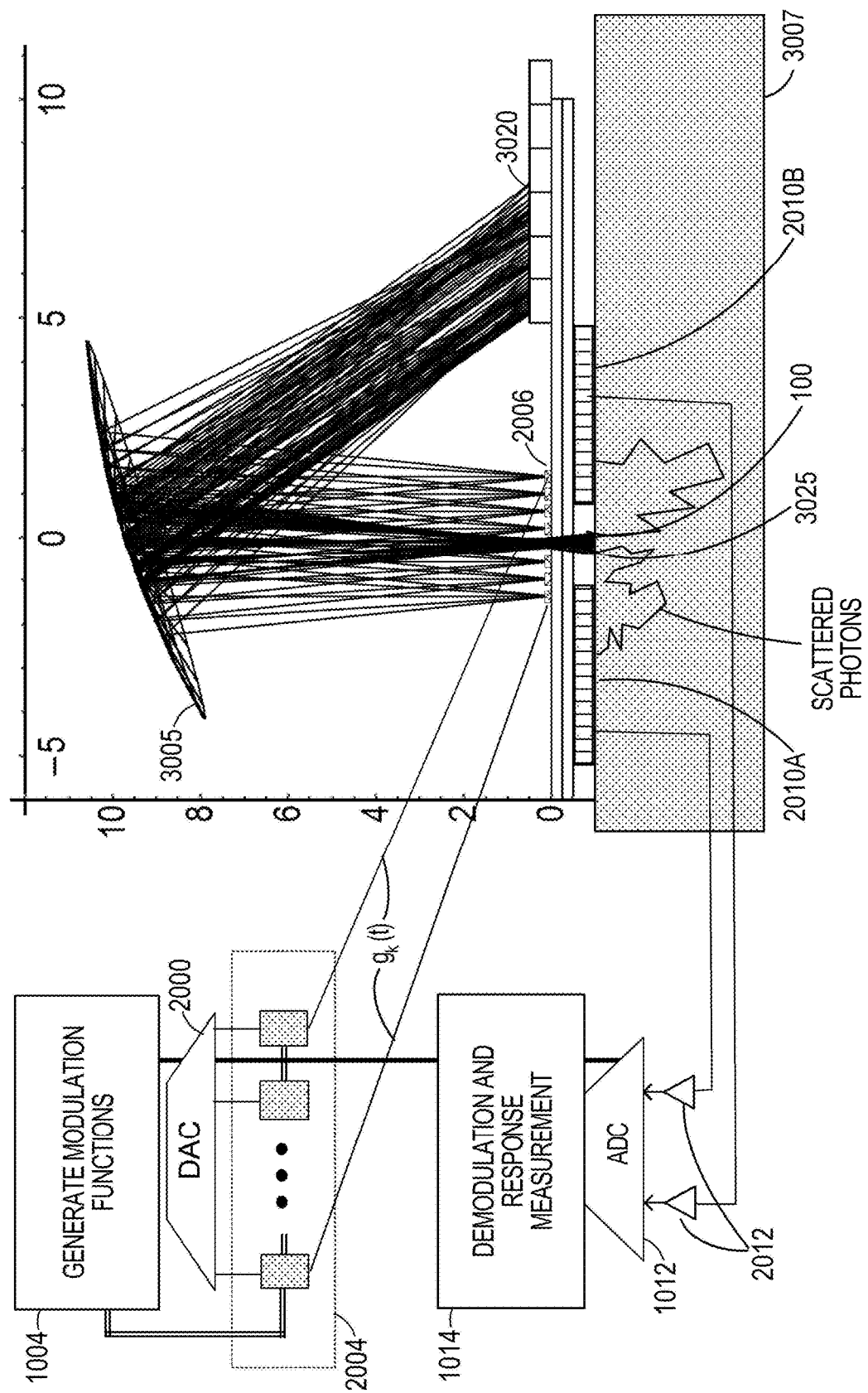
FIG. 3 is an illustrative drawing example of portions of a configuration suitable for a compact device.
Figure 4A:
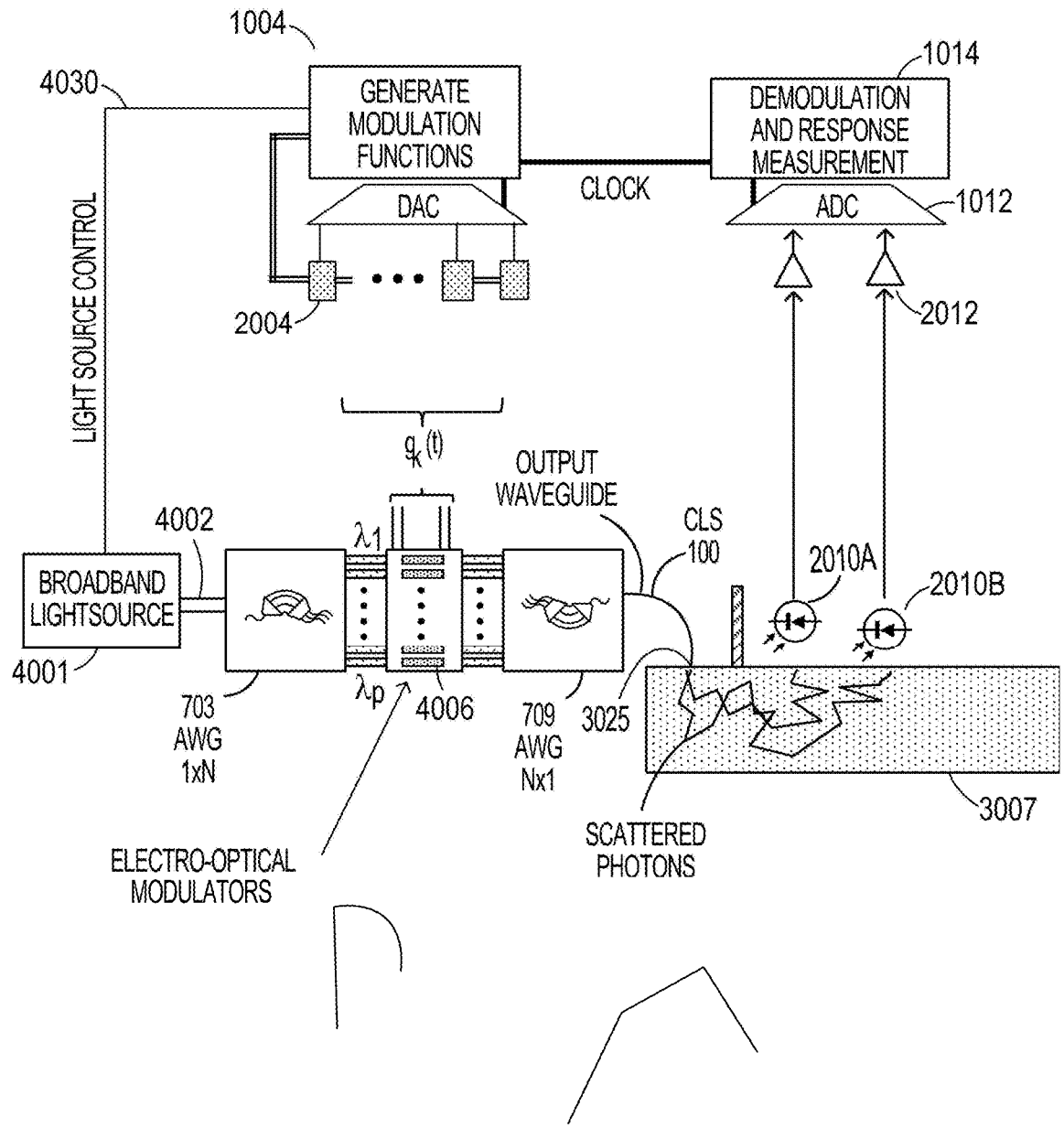
FIGS. 4A and 4B are schematic drawings illustrating examples of portions of different techniques of producing wavelength coded light (W-CLS) in a configuration suitable for providing a compact optical spectroscopic system.
Figure 4B:
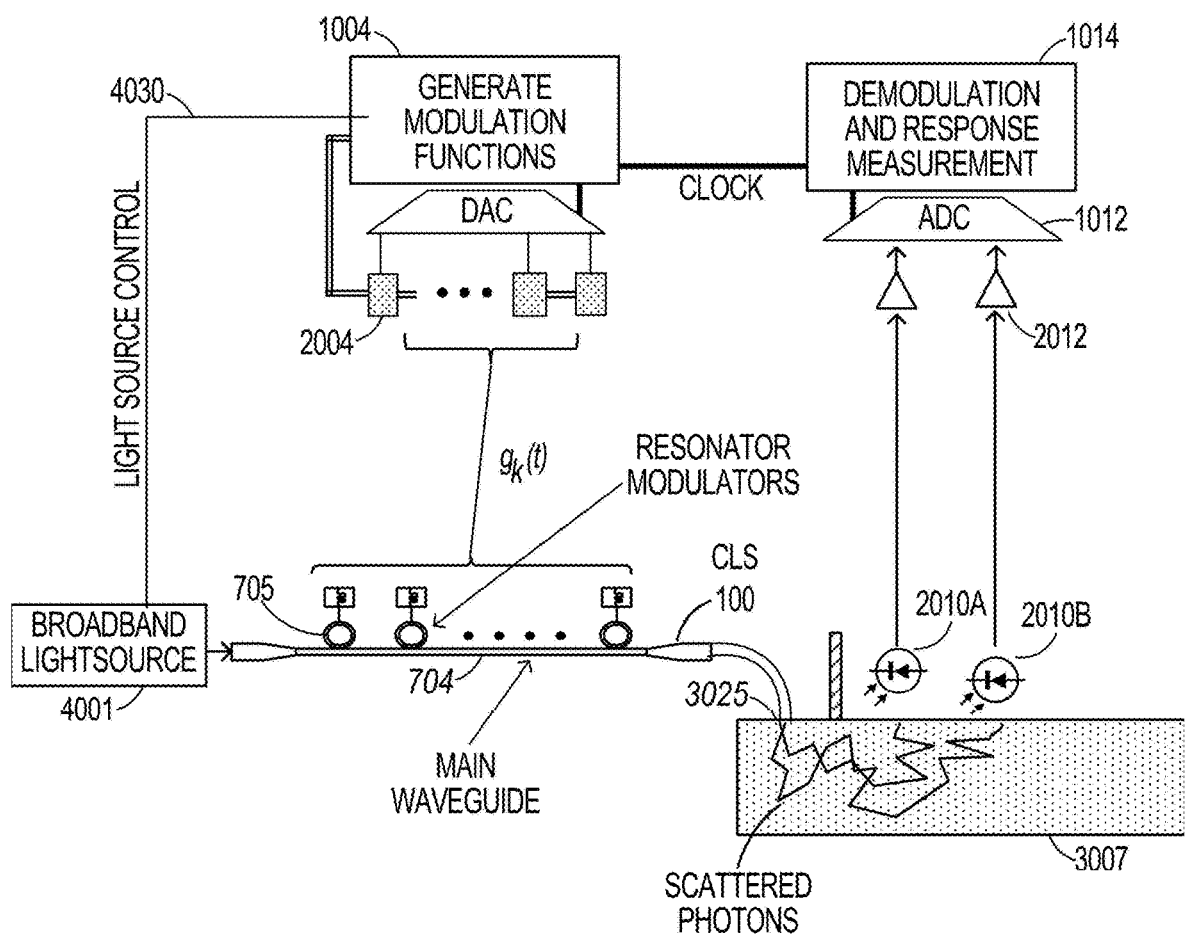
Figure 13:
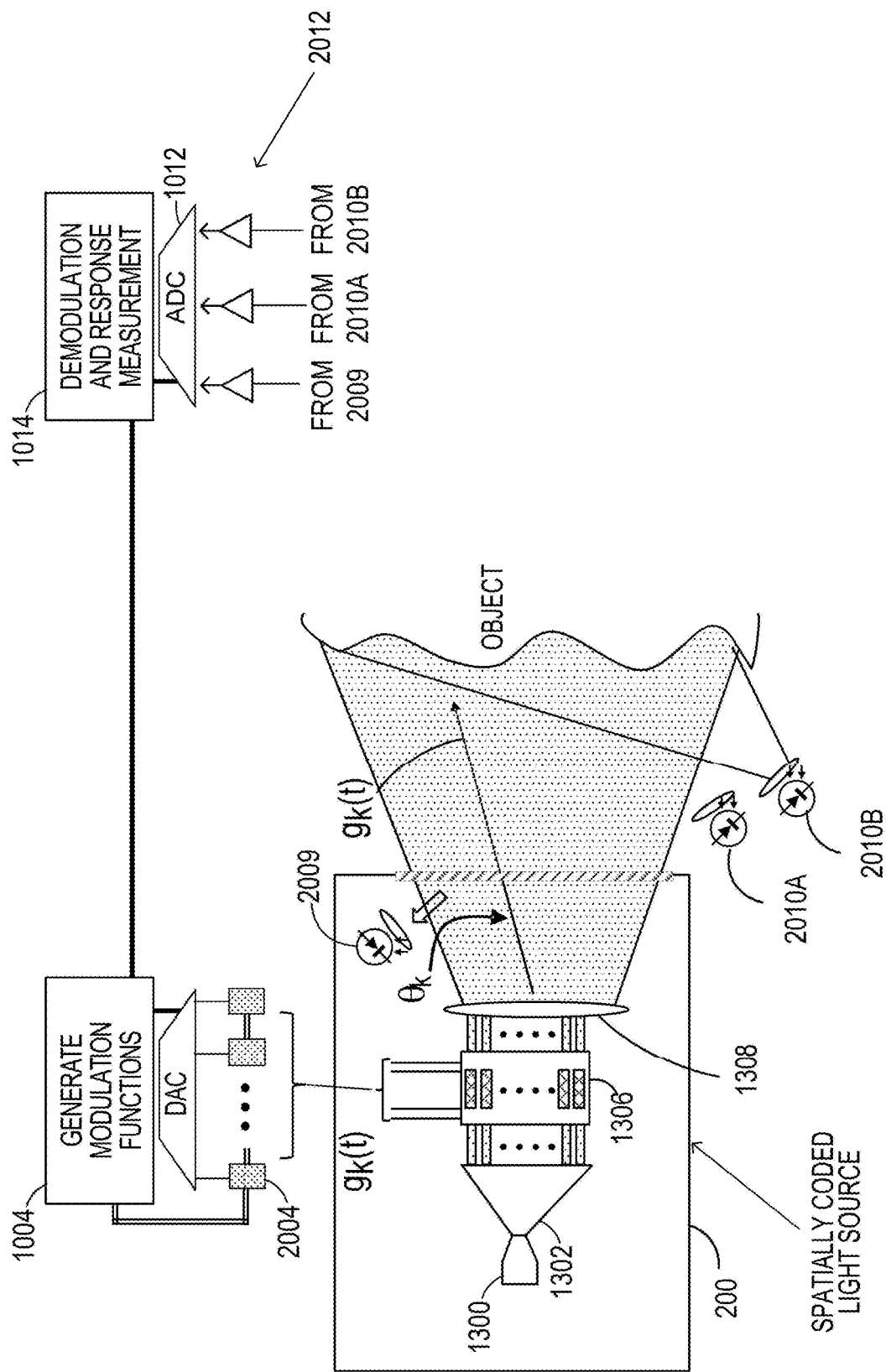
FIG. 13 is a schematic diagram showing an example of the system 1000 configured for employing the present CEA approach together with a Spatially Coded Light Source (S-CLS) such as for use in an imaging application.

The optical output of individually modulated optical portions of the modulation channels 1009 of the multi-channel electrical-to-optical converter 1006 can be prepared for illumination or projection toward the target, such as by various illumination optics 1008, depending on the task, such as described or incorporated by reference herein. For spectroscopy, the illumination optics 1008 can be configured to take all the individual wavelength components from the various modulation channels 1009 and combine them, such as shown in FIGS. 3, 4A, and 4B. For imaging, the illumination optics 1008 may be configured to project the individual wavelength components, such as shown in FIG. 13. The combined modulated illumination light forms a Coded Light Source-CLS 100.

The combined modulated illumination light of the CLS 100 can be scattered, transmitted, reflected, or can otherwise interact with the target object to produce a response light signal from the target object. A portion of the combined modulated illumination light of the CLS 100 can be sampled as a reference light signal for monitoring, such as via a "reference" signal pathway, before or without interacting with the target object. This modulated response light, reference light, or both can be transduced into a corresponding electrical response or reference signal by a corresponding photodetector in the receiver 1010 of an optical-to-electrical converter 1013. The electrical response signal and the electrical reference signal can then respectively be signal-conditioned by the receiver 1010, or other componentry of the optical-to-electrical converter 1013, which can include one or more ports and corresponding photodetectors 2010. In the optical-to-electrical converter 1013, the resulting signal-conditioned electrical response or reference signal can be provided to a single or multi-channel analog-to-digital converter (ADC) 1012 for conversion into a corresponding digital electrical signal. The ADC 1012 can perform the analog-to-digital conversion synchronized to the master common clock that is shared with and used by the excitation portion 1001 and response detection and signal processing 1005 portions of the system 1000, such as of the processing unit 1002. In an example, there can be one ADC channel 1011A . . . 1011K for each of the K ports of the receiver 1010. A separate ADC channel 1011 can optionally be provided for a reference channel carrying the reference signal that is generated without interacting with the target object. Note that multiple ADCs 1012 can be provided, e.g., one ADC 1012 for each receive channel or port of the receiver 1010, and the ADCs 1012 can be located near the measurement site. Each of these remote ADCs 1012 can perform an analog-to-digital conversion in a manner that can be synchronized or phase-locked to the master common clock. ADC data from each of the ADCs 1012 (or each of the ADC receive channels and the reference channel) can be communicated to the multichannel electronic demodulator 1014.

The demodulator 1014 can receive the digital electrical signal representation of the light received by each of the receive channels or ports of the receiver 1010, which can then be demodulated by the demodulator 1014 to recover demodulated response signals on a number of demodulation channels 1013A . . . 1013N that correspond in number to the number of modulation channels 1009. These demodulated response signals can then be further signal-processed such as to form an image or a spectrum. The demodulator 1014 is fully synchronous with the rest of the electronic system 1000, in accordance with the commonly shared master clock. The demodulator 1014 can use knowledge of the codes that were employed by the modulation code generator 1004 for modulation encoding on the respective modulation channels 1009, such as for performing demodulation decoding or other signal-processing on the digital electrical response light or reference light signals. Either the processor 1003 or the demodulator 1014 can also carry out various other operations. Such other operations can include one or more of time-stamping the data, averaging, dividing spectra of one of the ports with another (e.g., to normalize the response light signal to the reference light signal) and more.

Figure 2:
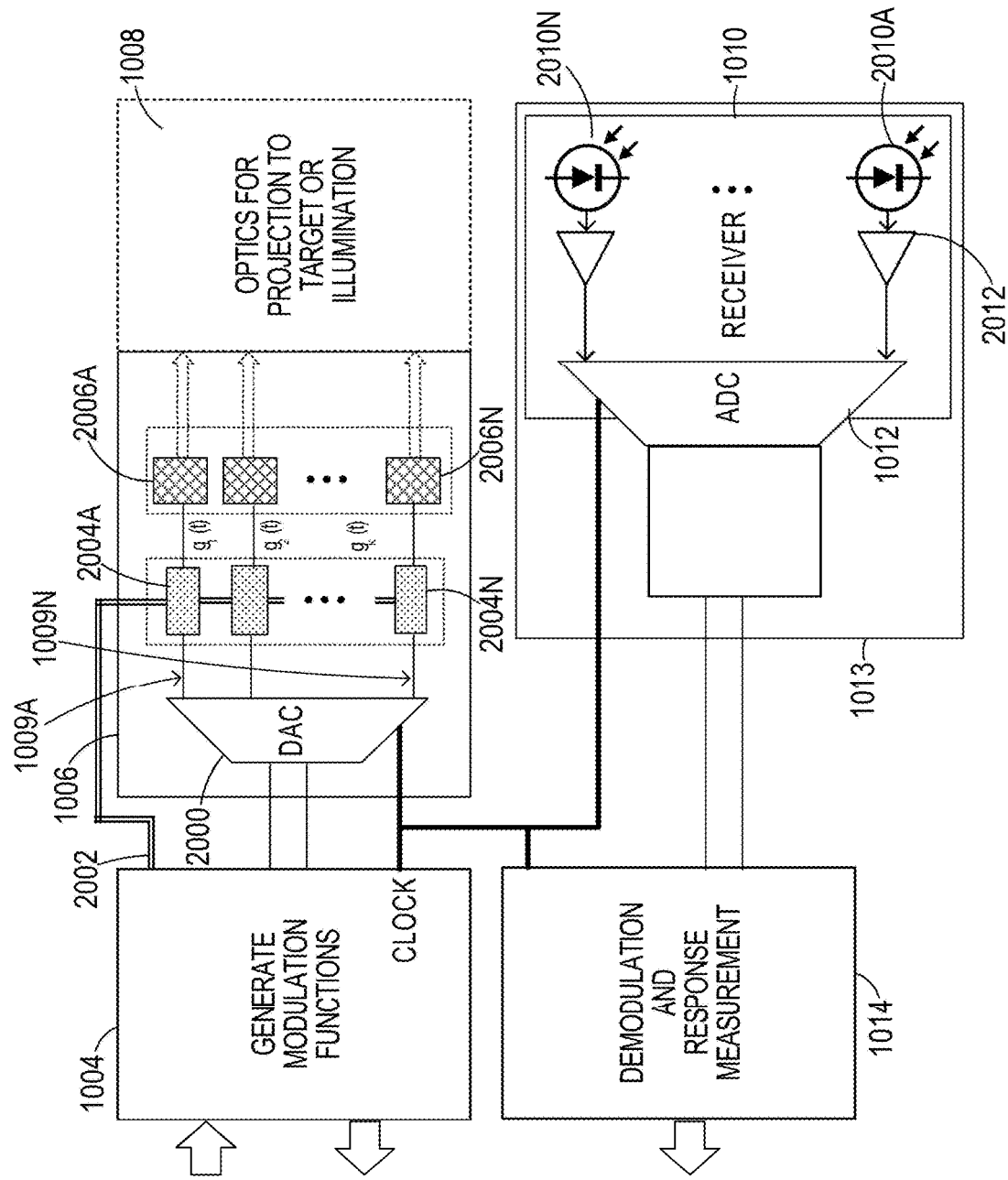
FIG. 2 is a schematic/block diagram that shows an example of portions of the present system, including some of the underlying components of an electrical-to-optical converter and an optical-to-electrical converter.

FIG. 2 is a schematic/block diagram that shows an example of portions of the system 1000, including some of the underlying components of the electrical-to-optical converter 1006 and the optical-to-electrical converter 1013. The electrical-to-optical converter 1006 can include various subsystems, such as a digital-to-analog converter (DAC) 2000. The DAC 2000 can be configured to generate the analog electrical signal representation of the modulation functions present as digital signals on the respective modulation channels 1009, based on digital electrical modulation function codes received as inputs by the DAC 2000 from the modulation code generator 1004. The DAC 2000 can include multiple modulation channels 1009, such as with one DAC circuit per modulation channel 1009, or with one DAC circuit providing respective time-multiplexed outputs to corresponding individual ones of the multiple modulation channels 1009, such as which can respectively be sampled-and-held by sample-and-hold circuitry provided on each individual ones of the multiple modulation channels 1009.

Individual ones of the multiple (N) modulation channels 1009 can also include corresponding gain and filter circuits ("driver circuits") 2004A . . . 2004N. An individual one of the gain and filter circuits 2004 can be configured to scale and shape the electrical waveform being provided on a particular modulation channel 1009, such as to help reduce or minimize noise, or to optimally drive the corresponding electrical-to-optical converter components 2006A . . . 2006N on each individual one of the multiple modulation channels 1009. In response, the driven electrical-to-optical converter components 2006A . . . 2006N produce the functions $g_k(t)$ as optical modulation on individual ones of the multiple modulation channels 1009 being individually modulated. The respective electrical-to-optical converter components 2006A . . . 2006N can take one of several different forms.

For example, the electrical-to-optical converter components 2006 can respectively include one or more LEDs or SLEDs, which can be configured to deliver a particular modulation channel's 1009 modulated optical output signal $g_k(t)$ in response to an electrical current signal received by the LED or SLED serving as the electrical-to-optical converter component 2006 of that particular modulation channel 1009. The electrical current requirements for each individual LED or SLED may be different depending on its emitted output light wavelength or wavelengths. The scaling and transforming of the modulated DAC output analog electrical signal to the appropriate current for driving the LED or SLED or other electrical-to-optical converter component 2006A . . . 2006N of a particular one of the multiple modulation channels 1009 can be performed by that modulation channel's 1009 gain and filter circuitry 2004A . . . 2004N, which can include voltage-to-current conversion circuitry, such as a transconductance amplifier. Furthermore, the individual gains of the gain and filter circuitry 2004A . . . 2004N of a particular modulation channel 1009 can be slowly adjusted over time, such as by a corresponding feedback or other control signal from the processor 1003, which can help take into account one or more variations such as can be due to LED (or other electrical-to-optical converter component 2006) or other component aging or various other slow changes.

In an example, the gain and filter circuitry 2004 of a particular modulation channel 1009 can include automatic adjustment based on direct feedback generated by the corresponding electrical-to-optical converter component 2006 of that modulation channel 1009. Such direct feedback can be provided using a small photodiode that can serve as a photodetector to monitor the output light provided by an individual one of the electrical-to-optical converter components 2006 corresponding to an individual one of the multiple modulation channels 1009, or using a current-sensing resistor that can be placed in series with the LED, SLED, or other electrical-to-optical converter component 2006 of an individual one of the multiple modulation channels 1009.

The electrical-to-optical converter components 2006 need not be limited to an LED or a SLED or light-producing component. For example, the individual electrical-to-optical converter components 2006 can be implemented as including a waveguide Mach-Zehnder interferometer (MZI), which can produce complementary signals for the two arms of the MZI as well as producing bias voltages for optimally modulated MZI light output. In another example, the individual electrical-to-optical converter components 2006 can be implemented as including a series of ring modulators, such as shown in FIG. 4B, in which case an individual modulation channel's 1009 ring modulator can include both a modulated optical signal and a bias for each one of the individual rings. Optionally, the series of ring modulators can even be configured to produce auxiliary currents to help facilitate temperature tuning of individual rings in the ring modulators being used as the electrical-to-optical converter components 2006.

In an example, at least two levels of dynamic control over the modulation and electrical-to-optical conversion can be provided: (1) a first level of control at the higher level of digital synthesis of the modulation codes that control the amplitude and bias of the digital codes, such as in response to the information from the measured reference spectrum (e.g., obtained via the reference pathway) or other user-determined target spectrum; and (2) a second level of control at the local level of a particular channel's LED or other electrical-to-optical converter 2006 or its driver 2004, such as described above. The higher-level of output power control loop can help allow compensating for one or more of: (a) each LED of different color has different quantum efficiencies; (b) the illumination optics 1008 of the system 1000 may have a wavelength dependent transmission from the LED serving as an electrical-to-optical converter 2006 to the illumination output from the illumination optics 1008 of the system 1000; or (c) when there is a need to increase or decrease the output of certain wavelengths, such as to help compensate for extra absorption, reflection, or scattering at a particular wavelength for the target object under study. These compensation parameters may be changed over time, such as to help adapt to the environment or to help counteract slow degradation or other change in performance of one or various components.

FIG. 3 is an illustrative drawing example of portions of a configuration including illumination optics 1008 portions of the system 1000 that can be suitable for a compact device, such as which may be worn by a subject or carried in a small pouch for providing rapid measurement. Several illustrative examples of illumination optics 1008 are described in the above-incorporated Deliwala U.S. Pat. No. 11,704,886. In the example shown in the present FIG. 3, an electrical-to-optical converter 1006 can include multiple individual electrical-to-optical converters 2006 such as corresponding to individual ones of multiple modulation channels 1009, such as, for example, eight channels respectively corresponding to eight LEDs 2006A . . . 2006H or $N_\lambda=8$. Each of the LEDs 2006 can respectively be electrically connected to a corresponding modulation channel's 1009 gain and filter circuitry 2004. Each individual one of these eight LEDs 2006 can have different output wavelengths from the LEDs 2006 used by the other modulation channels 1009. The illumination optics 1008 can include a concave mirror 3005 and a grating 3020 that, together, optically gather the light spectra of each of the LEDs 2006 and combine all of the different wavelengths into a single CLS 100 illumination beam for illuminating the target tissue 3007 or other target object at a target illumination entry location. Although FIG. 3 shows an example in which the illumination light of the CLS 100 is made incident onto tissue directly, the light from the CLS 100 can be projected onto a more distant object or carried by an optical fiber or fiber bundle to the desired illumination site for delivery to the target. For a measurement of a target analyte, such as in vivo glucose, alcohol, $SpO_2$, or one or more other tissue or other physiological parameters, the light from the CLS 100 may include many modulated wavelengths that concurrently enter the target tissue at the illumination entry location 3025. One or more photodetectors 2010, such as the photodetectors 2010A and 2010B shown in FIG. 3, can be located near the illumination entry location 3025 and can be used to measure the scattered photons generated in response to the illumination light. While FIG. 3 shows an example in which two photodetectors 2010A and 2010B are located symmetrical to the illumination entry point 3025, for illustrative convenience, the photodetectors 2010A and 2010B can be placed anywhere appropriate to particular needs for optical tissue assessment or other application of interest. More than two photodetectors 2010 can also be used. In an example, some of the photodetectors 2010 may be silicon photodetectors, such as to cover photon detection at visible and near infrared wavelengths, and some of the photodetectors 2010 may be non-silicon photodetectors, such as InGaAs photodetectors, such as for covering a shortwave infrared (SWIR) region such as for in vivo measurements of certain molecules such as glucose, etc. These photodetectors 2010 can respectively be connected to corresponding signal conditioning low-noise amplifiers 2012, such as with one low-noise signal conditioning amplifier 2012 provided at each of the photodetector ports of the receiver 1010 of the optical-to-electrical converter 1013.

FIGS. 4A and 4B are schematic drawings illustrating examples of portions of different techniques of producing wavelength coded light for a wavelength coded light source (W-CLS) in a configuration suitable for providing a compact optical spectroscopic system. Electrical-to-optical conversion by the electrical-to-optical converter 1006 can be performed using individual electrical-to-optical converter components 2006 or that can respectively include silicon photonics and related photonic integrated chip (PIC) electrical-to-optical converter components 4006, such as which can be made on various platforms such as InP to thin-film lithium niobate. Together with one or more broadband light sources 4001 providing input illumination energy, such as via an input waveguide 4002, separating the light spectrally into various wavelength groups or "bins" such as using an arrayed waveguide grating (AWG), Echelle grating or similar spectral separator device 703, which can include or be coupled to corresponding modulation channels 1009. Then, a downstream waveguide electro-optical modulators 4006 including or coupled to the respective modulation channels 1009 can perform modulating individual ones of the wavelength bins of the respective modulation channels 1009. This can include using a MZI (see FIG. 4A). Then, a downstream spectral recombiner 709 can be employed for combining the modulated wavelength bin outputs from the various modulation channels 1009 corresponding to the respective outputs of the corresponding waveguide electro-optical modulators 4006, back to a single output illumination light beam by reversing the spectral separation. The recombined single output illumination light beam can then be used for illuminating a target at an illumination entry location 3025.

FIG. 4B shows an example that can employ a bank of ring modulators 705 that can modulate light provided by a broadband light source 4001. The light modulation frequencies can correspond to the resonance frequencies of the individual ring modulators 705, without requiring spatial separation of the light. As shown and described with respect to FIG. 3, the coded illumination light can be made incident on a tissue region at an illumination target entry location 3025 or projected elsewhere. Response light scattered from the tissue region 3007 can be detected by one or more photodetectors 2010A and 2010B, with signal conditioning and demodulation carried out such as explained herein. The entire PIC of FIG. 4A or 4B (which includes various sub-elements that work together to provide modulated optical output on spectral bins corresponding to the respective modulation signals on the respective modulation channels 1009) can be small and flat and can be easily co-packaged with CMOS or other electronics of the CEA, permitting direct implementation in wearable device (e.g., a smart watch or smart ring) or a smart phone.

Typically, a very small fraction of the incident photons on the skin or a scattering object can be collected. Most of the photons are absorbed or scattered in other directions and not detected by the photodetectors 2010. For example, for wearable blood oxygenation measurements, as little as 1 in 10,000 incident photons are collected by the photodetectors 2010. For glucose and other target analyte molecules, for which spectroscopy is carried out in the presence of background water absorption and low scattering, similar photon collection efficiency can be obtained. The collection efficiency can be boosted by using a large photodiode 2010, since the scattered light within the tissue is spread over large skin area, and by placing the large photodiode 2010 closer to the skin to enable the photodiode 2010 to collect larger "cone" of scattered photons. Providing some particular optics may be helpful here. In the case of low scattering in tissues, the incident homogeneous illumination beam of combined coded illumination light from the CLS 100 may be made incident at an oblique angle to the skin and multiple large-area photodiodes 2010 may be used (e.g., located in a direction along the skin toward which the incident light is angled) to help boost photon collection efficiency by one or more orders of magnitude. Because power consumption is of major practical importance in a wearable device operating from a battery, boosting photon collection efficiency and driving light source(s) at a most efficient operating point can both become very important. The present CEA can help enable these optimizations such as by allowing use of large-area photodiodes 2010 with high capacitance (and yet not increasing the noise), reduced shunt resistance (and yet keeping noise at minimum), driving LEDs or other electrical-to-optical converter components 2006 with continuous low average power thereby reducing high stress current draws from the battery, minimizing electronic and other interference by signal-processing and making designing tightly packed electronics easier.

In various examples of the present approach, it is easy to change the number of modulation channels 1009 from as few as three to as many as 256, for example. For illustration purposes and ease of understanding, many of the examples in this document show eight modulation channels 1009, corresponding to eight LEDs or other electrical-to-optical converter components 2006 or eight modulated optical outputs. While these examples of optical coding show the output coded light being used for tissue measurement, the electronics and the optical systems shown and described herein may additionally or alternatively be used for ultra-sensitive measurement of environmental gases in the mid-wave infrared (MWIR) or long wave infrared (LWIR) region by appropriate illumination and collection of light after interaction with the target gas, target substance, or target object. Some examples are described below at the end of this patent specification.

The present techniques of using W-CLS for spectral analysis of a target analyte or imaging has many points of distinction from Wavelength Division Multiplexing (WDM) for communications applications. WDM systems use lasers with very narrow line widths, produce high speed binary or at most 4-level modulated output for digital communication, the communications receiver is remote, and each of the photodetectors receives a single wavelength. The present W-CLS system 1000 for spectral analysis or imaging can use broadband incoherent light sources such as SLEDs, can share a common clock in a closed loop system (receiver is local to the transmitter, both receiver and transmitter sharing and synchronized by the common clock) and each of the receiver ports with a photodetector 2010 receives the entire modulated spectrum. Furthermore, the present goal is not to reconstruct binary bits of communication, but instead to construct a high-resolution analog spectrum or image of the target object.

Potential advantages of the present CEA can be compared with other approaches to technologies and optical devices in which spectral or spatial variations by illuminating the object with different wavelengths for spectral measurements or at different locations for spatial imaging is carried out with a single photodiode or a receiver. Focusing again on spectral applications, the present approach can be compared to one or more other approaches, as explained below.

(a) Scanning Monochromator.

In this approach, a broadband light source of total optical power P is spectrally separated and a narrow spectral region from the light source is presented. The selection of the spectral region is done by changing the position of the dispersive element such as grating, and one wavelength at a time is sequentially presented to the target object for measurement of scattered, transmitted, or reflected light. Thus, in a scanning monochromator approach, to finish the scan in time $T_{seq}$, with Na wavelength bins, the photodetector receives only fraction of the total optical power produced by double division—division by wavelength by dispersive device by at least Na and then division by time due to sequential scanning by another at least $N_\lambda$. Thus, in this approach, the photodetector receives wavelength dependent power $$P_\lambda \propto \frac{P}{N_\lambda^2}$$

and it must have bandwidth larger than $$BW \geq 5\left(\frac{N_\lambda}{T_{seq}}\right).$$

thereby making for a noisier measurement than the present approach.

(b) Tunable Lasers or Tunable Light Sources.

In this approach, the light source itself is tunable in wavelength rather than taking a broadband light source and then selecting a narrow wavelength region for spectral measurements as described for a monochromator. This tunable wavelength approach can have rapid response, as some of the systems are electrically tunable. Examples of this approach can include devices such as tunable diode lasers or external cavity (Fabry-Perot or dispersive) tunable lasers. In general, these are spectrally very narrow and often suitable for measurement over a narrow spectral range. For the measurements we are interested in, the range of wavelengths is very large and there are no tunable wavelength light sources that can be tuned over such a large range of wavelengths. Furthermore, these tunable wavelength systems are quite expensive. In this tunable wavelength approach, one only has one division of optical power on the detector-division by time due to scanning sequence of wavelengths via wavelength tuning.

(c) Time-Multiplexed LED or Laser Systems.

In this approach, different LEDs or lasers with different spectral colors are sequentially presented for measurement of an optical response. This may be appropriate if there are few wavelengths of interest and rapid measurement at low cost is desired. This approach can provide high SNR in a cost-effective way at very low power consumption. The photonic devices using time-multiplexed electronic architecture (TMEA) are usable in many applications. These include: SpO$_2$ measurement using two or more LEDs, heart rate measurement in wearable devices such as a watch, differential spectral measurement of gases such as CO$_2$ or methane, quality control in agriculture or industrial processing for sorting by rapid illumination of different color LEDs, measuring nutrients and molecules such as glucose, flow cytometry, particle measurement, and many more. In general, in this approach, these systems with LEDs are used without optical filtering to narrow the LED's quite broad spectral output (whose spectral shape is a function of temperature, current, age, and batch) and are not very good choices for precision spectral measurements that are narrower than the LED's spectral width. In this approach, one only has one division of optical power on the detector-division by time due to scanning but in practice, since different LEDs are energized in different time slots, a high peak power can be produced to compensate for division in time due to sequential scanning.

(d) Fourier Transform Spectrometers (FTS)

This approach can use a Michelson interferometer to produce modulation of each wavelength in the spectrum based on the motion of one mirror relative to the other. The spectrally relevant output of the interferometer can be expressed as $$\int A(\lambda)\cos\left(2\pi \frac{OPD}{\lambda}\right)d\lambda,$$

where OPD is the optical path difference in the Michelson interferometer. In this approach, there is no control over the relative phases of the wavelengths except for some variation as determined by the dispersive nature of the optics. The cosine function is the only available function in such a system. To recover the spectrum A($\lambda$), OPD is measured by interferometric output of a separate precise laser of much shorter wavelength. In this approach, these systems are highly susceptible to vibrations, require high dynamic range for the detector to get good measurements near zero OPD, and needs a scanning interferometric system with extreme mechanical stability. It is the most efficient of the various comparative approaches described herein, as all the power is available on the detector for all the measurement time. Thus, there is no division of wavelength or division by time. The only loss comes from the low etendue of the Michelson interferometer.

Regarding the various comparative approaches mentioned above, time multiplexed electronic architecture (TMEA) approaches may be regarded as the most convenient and most efficient in terms of required electrical power. Examples of a TMEA are described in U.S. Pat. No. 10,056,868B2, U.S. Pat. No. 9,130,070B2, and USRE48996E1).

By contrast, the present approach can provide a Coded Modulation Electronic Architecture (CMEA or CEA) that can compete favorably with a TMEA comparative approach, such as described above. Fourier Transform Spectroscopy (FTS) can provide another approach that can be accurate in laboratory settings but that remains expensive and cumbersome for high volume or applications with flexible spectral and form factor needs. In general, approaches using scanning systems are too cumbersome for wearable or large volume applications (but one of the most precise approaches for laboratory use). The only practical approach for large-scale use are time-multiplexed systems, and hence this document may compare potential advantages of the present CMEA approach over a comparative TMEA approach.

Figure 5A:
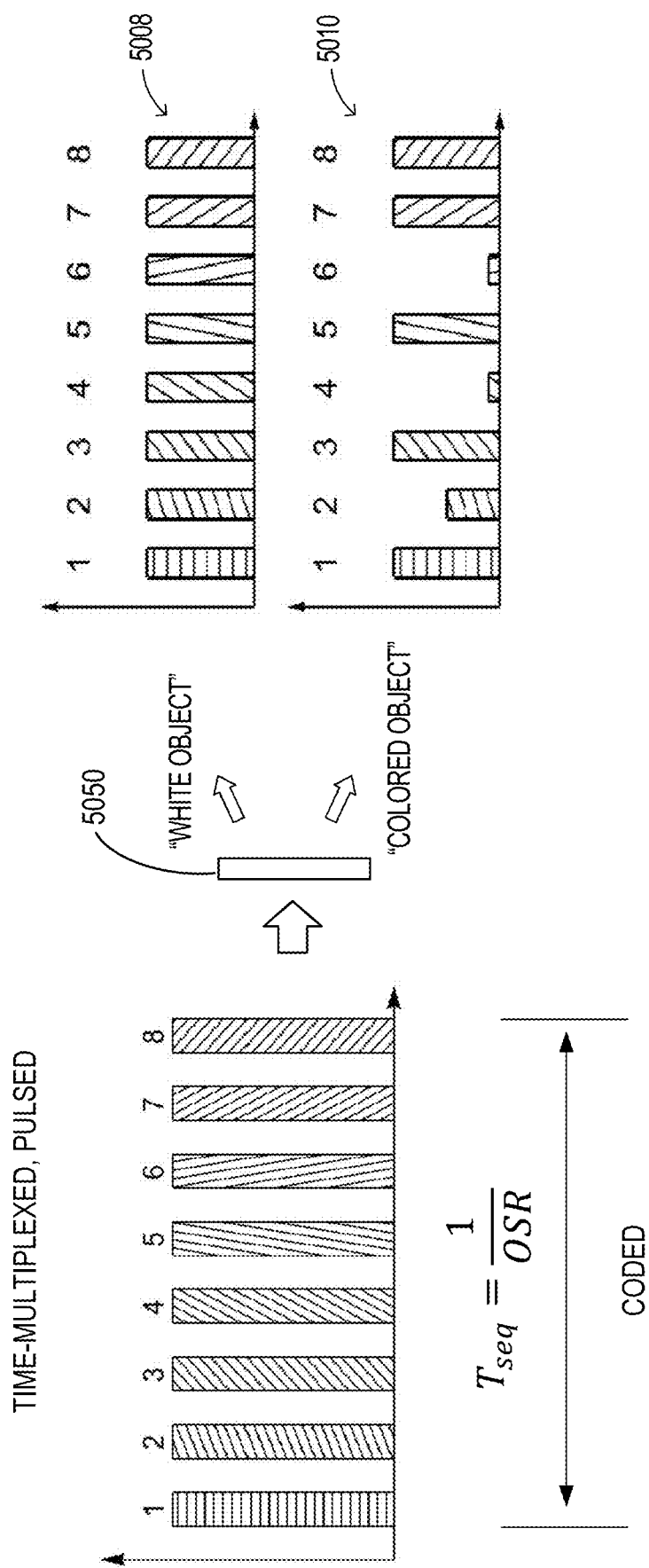
FIGS. 5A, 5B, and 5C collectively show a computer-modeled comparison showing both a time multiplexed approach (FIG. 5A) and coded modulated light approach (FIG. 5B) for an illustrative example of a case using 8 wavelengths and showing an effect of phase selection (FIG. 5C).
Figure 5B:
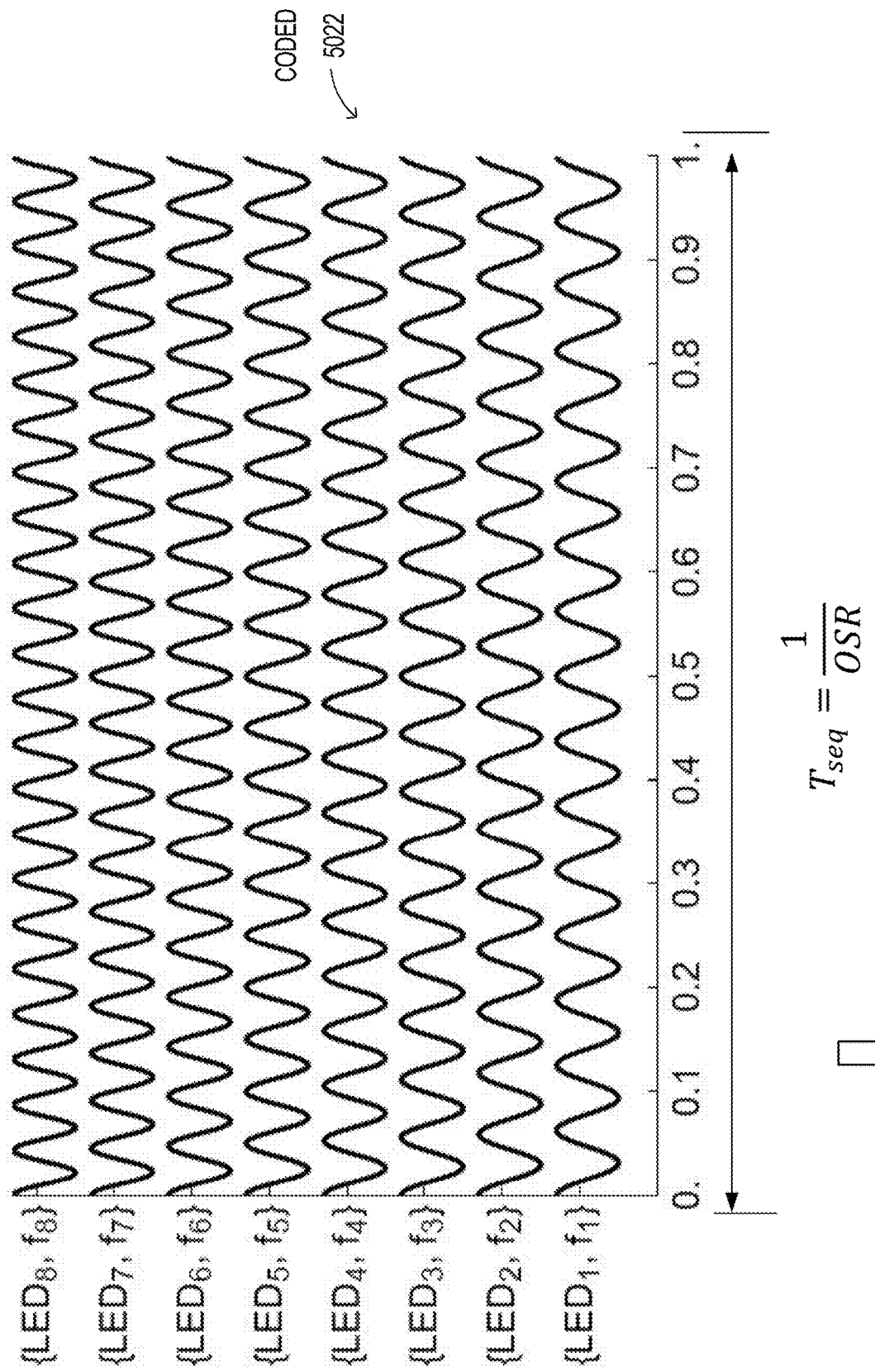
Figure 5B:
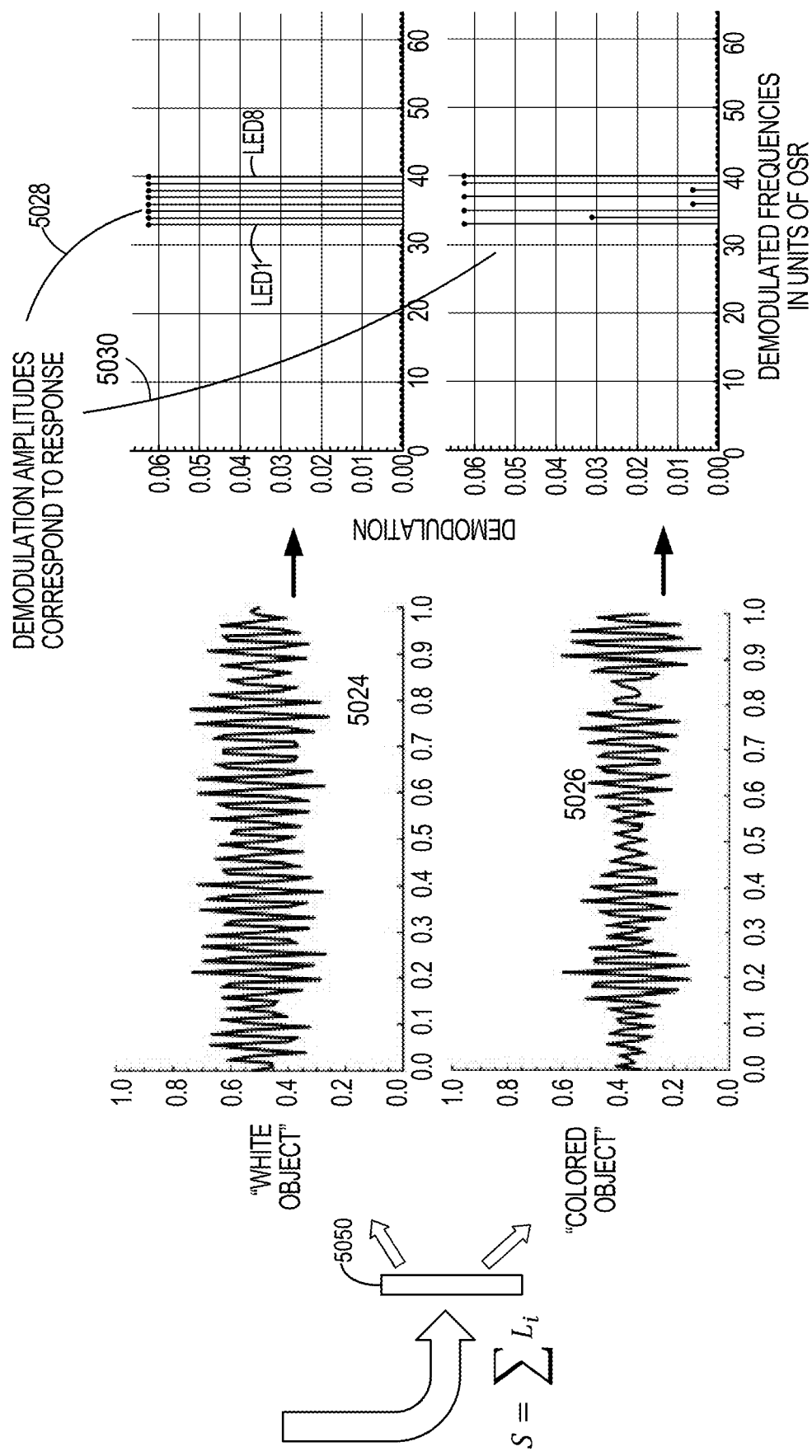
Figure 5C:
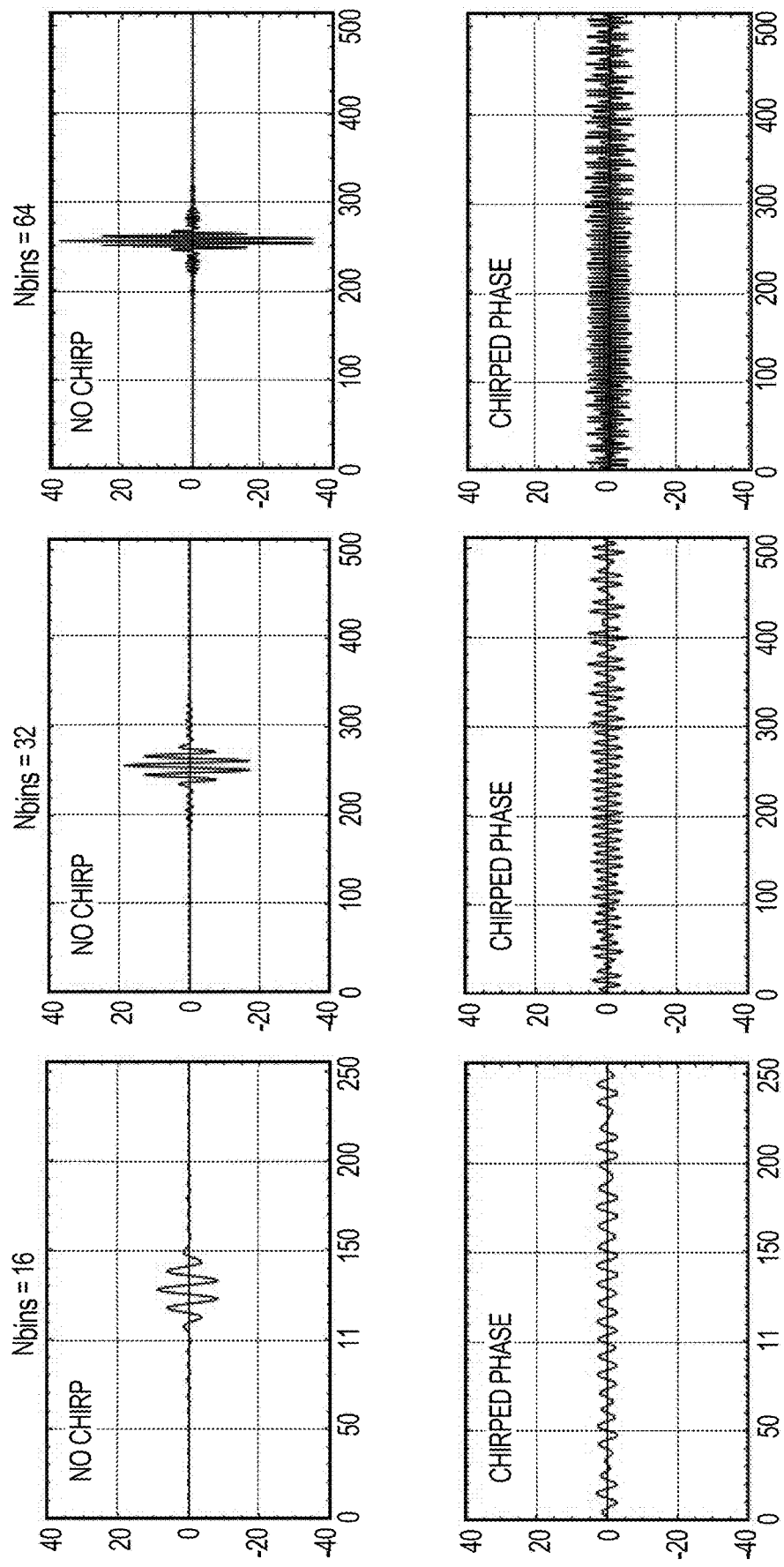
Figure 5C:
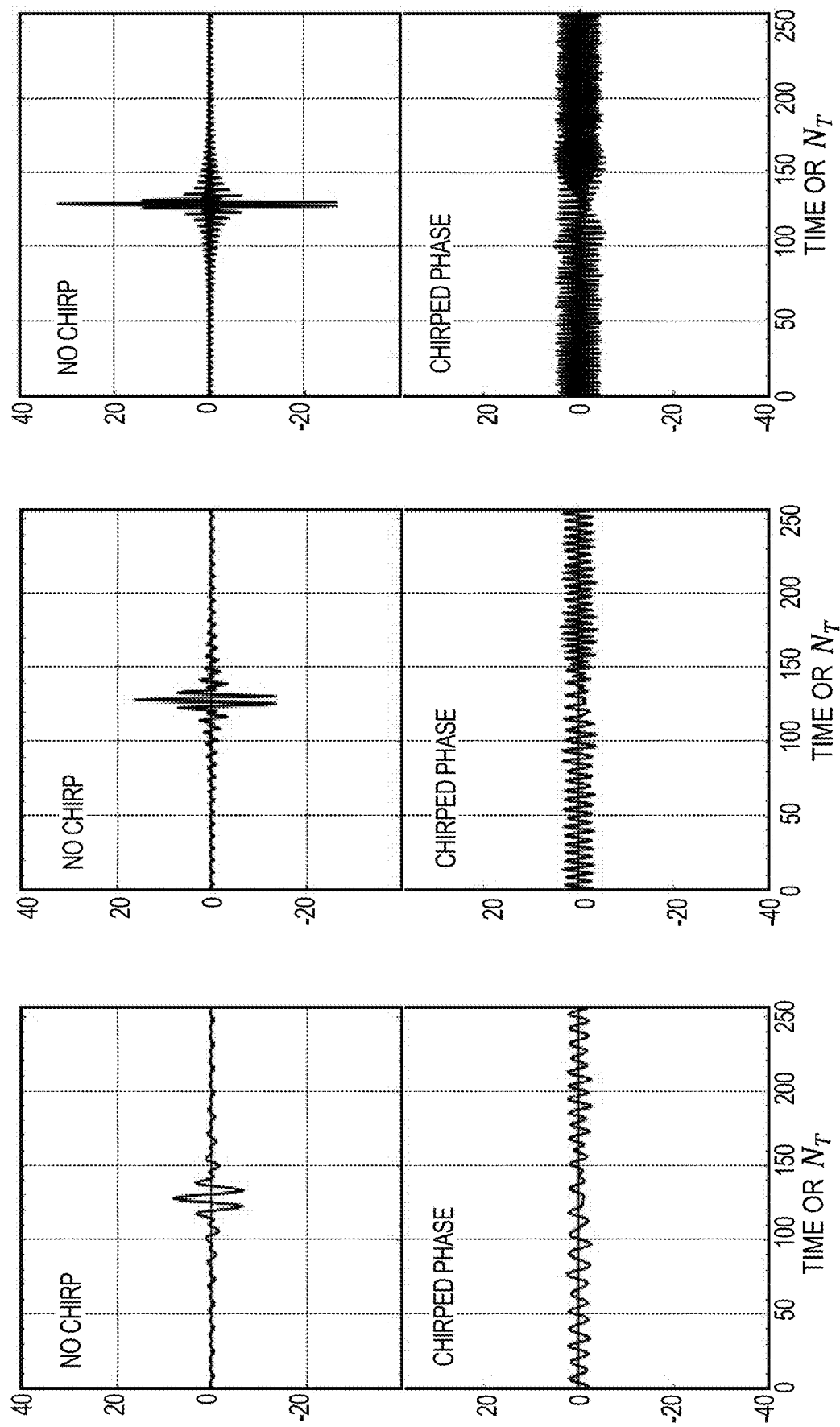

FIGS. 5A, 5B, and 5C collectively show a computer-modeled comparison showing both a time multiplexed approach (FIG. 5A) and coded modulated light approach (FIG. 5B) for an illustrative example of a case using 8 illumination wavelengths, and showing an effect of phase selection (FIG. 5C).

FIG. 5A shows an illustrative example of a time-multiplexed approach of a repeating sequence pulsing of eight different LEDs of different wavelengths. In this time-multiplexed approach, the photodiode and the receiver electronics for TMEA keep track of the sequence and separately measure the response to the time-multiplexed illuminations of each LED. The best measurement operation, which removes some of the ambient noise as well as low frequency 1/f noise, is by subtracting the response of each LED during its ON phase to the OFF response when no LEDs are lit. We will call this operation ON-OFF and this is carried out for each LED to produce a response measurement. The sequence repeats in a cyclical fashion at the required output spectral rate $$R = \frac{1}{T_{seq}}.$$

This ON-OFF operation immediately measures the spectral response of the object as shown at 5008 for a spectrally neutral or "white" target object and at 5010 for a "colored" target object.

FIG. 5B shows an illustrative example of a coded light approach in which light from an LED or other electrical-to-optical modulation component 2006 is continuously modulated, e.g., such as by a set of non-binary modulation functions. In FIG. 5B, different sinusoidal frequencies are used to concurrently encode the light with corresponding modulation functions. Later we show examples of other codes and enhanced techniques to improve on ambient interference (both optical and electronic) and different kinds of coding methods. The approach shown in the example of FIG. 5B uses modulation codes:

$$g_k(t) = a_k + b_k \cos\left(2\pi f_{mod} k \frac{j}{N_T} + \phi_k\right), j = 0, 1, \ldots N_T - 1$$

If we further choose that all the modulation frequencies must be between some starting frequency $f_0$ and $2f_0$ to avoid overlap with the harmonics of one modulation channel 1009 interfering with the any other modulation channel 1009, and we repeat the sequence at a rate R, then the first modulation frequency must be at $f_1 = N_\lambda R$ and the last one at $f_{N_\lambda} = 2(N_\lambda - 1) R$. The difference between modulation frequencies will be equal to R and the sum of the outputs from all the LED modulation channels 1009 will repeat at rate R. In order to find the actual spectral response of the target object, one can measure the change in $b_k$ (remember that for each modulation frequency there is an associated optical wavelength) such as by performing multi-channel demodulation using various techniques, such as Fourier Transform, Goertzel algorithm, or direct I-Q demodulation. This is shown in FIG. 5B at 5028 for "white" response and at 5030 for a target object with "color".

FIG. 5C shows that for optimal use of the dynamic range, the phases $\phi_k$ should be chosen to produce least "peaky" output. If all phases are in alignment, or $\phi_k = \phi$, then one gets a large peak when all the cosines are in phase, which will reduce the dynamic range, since the peak should not clip the receiver range. In the comparative FTS approach, the physical nature of a Michelson interferometer-based modulation causes large zero path length peak that must be treated carefully. By contrast, in the present concurrent coded modulation approach, because we are synthesizing the modulation codes, we can pick $\phi_k$'s that can be appropriately phase-shifted or phase-scrambled such as to help reduce or minimize large deviations and thereby significantly improve utilization of the dynamic range. This is a significant benefit to the present coded modulation of light approach, and we do not have to worry about zero-path drift, zero path non-linearity etc. There are many choices of phases, but the one used in the plots for the bottom row of FIG. 5C is $$\phi_k = \pi \frac{k(k - N_\lambda)}{N_\lambda}.$$

In this scrambled phase condition, the amplitude of the combined beam grows as $\sqrt{N_\lambda}$ enabling a much higher dynamic range.

From the above analysis, there is a substantial difference in the bandwidth requirements for both the transmitter and the receiver. For the present approach employing CEA, $BW_{CEA} \sim 2 N_\lambda R$. For a comparative TMEA approach, since one must settle the amplifier before the next pulse arrives, the TMEA approach will need the amplifier bandwidth to be at least ten times the reciprocal of the pulse width, if not more. For the time-multiplexed approach, this can be expressed as:

$$BW_{TM} \sim 10 * 2 N_\lambda R \sim 10 \, BW_{CEA}$$

The noise bandwidth of the two approaches is also different. For the CEA approach, after demodulation, we only get noise in a frequency width of R regardless of the number of coded channels. Thus, $NBW_{CEA} = R$. For the comparative TMEA approach, the ON-OFF operation folds the full bandwidth of the TIA and due to ON-OFF operation the resulting noise bandwidth can be expressed as:

$$NBW_{TMEA} \sim \sqrt{2} \, BW_{TM} \geq (28 \, N_\lambda) NBW_{CEA}$$

Figure 6A:
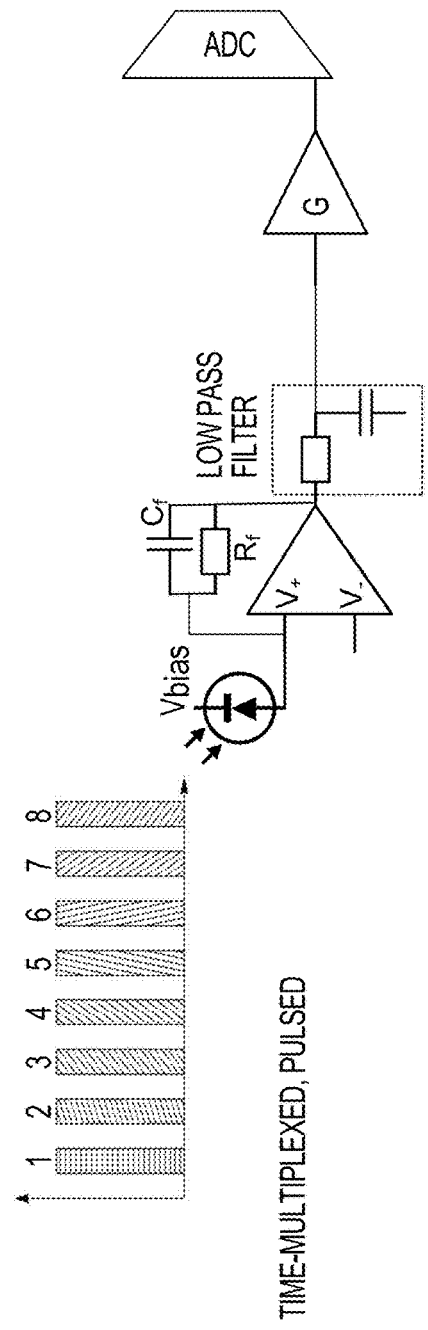
FIGS. 6A and 6B show schematic diagrams illustrating examples of a transimpedance amplifier (TIA) arrangement for a Time-Multiplexed Electronic Architecture (TMEA) comparative approach (FIG. 6A) and a Coded modulation Electronic Architecture (CEA) approach (FIG. 6B), respectively.
Figure 6B:
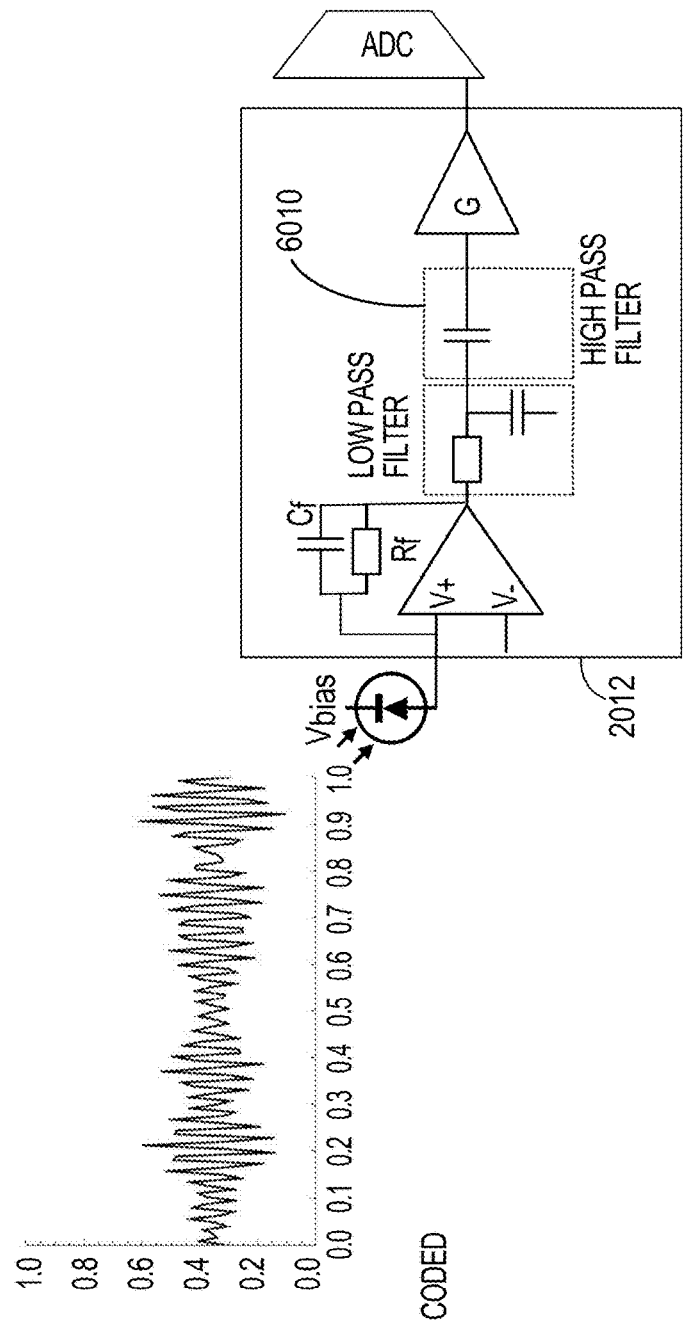

FIGS. 6A and 6B show schematic diagrams illustrating examples of a transimpedance amplifier (TIA) arrangement for a TMEA approach (FIG. 6A) and a CEA approach (FIG. 6B), respectively. There are also other systems for measuring photons. Such systems can include componentry for collecting the charge produced by photons on a capacitor (e.g., the capacitance of the photodiode itself or the capacitance of an integrating amplifier) or converting the incident photon absorption into the photodetector into a change of resistance of the photodiode and measuring this change, such as by converting the absorbed photons into heat and then measuring the change in the resistance or other parameter that depends on the temperature. In such photodiode amplifier systems, the change produced by a photodiode is always unidirectional, because the photodiode rectifies the incoming electromagnetic wave. Thus, the first stage of amplification is usually DC coupled. For example, placing a resistor in series with a biased photodiode can provide a current-to-voltage converter for converting the photocurrent produced by the photodetector in response to incident photons into an electrical voltage signal that can be further processed.

The output range of the first amplifier should be such that the peak pulse amplitude of the response light plus the ambient light does not saturate the output. Accordingly, care should be taken to shield the photodetector from ambient light (e.g., such as sunlight for a wearable device) or to reduce the first amplifier gain $R_f$ to prevent saturation of the first amplifier. Because providing most of the gain at the first amplifier stage is helpful for reducing the effective input-referred current noise, the second amplifier stage (e.g., downstream from and in series with the first amplifier stage) can act as a buffer amplifier, providing, at most, a second amplifier gain on the order of about G=2, for example. This can mean that the effective input-referred noise can be approximated as the ADC voltage noise divided by the feedback resistor $R_f$. It is very difficult to dynamically change $R_f$ or G with rapidly varying ambient light, and it is hard to distinguish between the ambient light and the response light to the pulsed LED illumination.

In the present approach to providing an amplifier for the CEA architecture, there can be provided a higher second stage gain of G=10 or more, since the DC component of the LED illumination outputs as well as all the DC and the low frequency components of the ambient light are removed or attenuated by the high pass filter 6010, which can be provided in the signal path between the first amplifier having gain $R_f$ and the second amplifier having gain G. The high-pass pole frequency or "corner" frequency of the single or multiple-pole high pass filter 6010 can be set below the lowest modulation frequency or frequency component of the modulation codes. The scrambling of phases described earlier can also help enable an increase the second stage amplifier gain G without saturating the dynamic range of the second stage amplifier. Thus, the present approach to CEA allows lowering of the ADC's impact on the input referred noise to be negligible or to be below all other noise sources. In comparison, this is quite difficult to achieve for the TMEA approach and architecture without resorting to electronics that operate with 15 V power rails, which would make such electronics both power hungry and making it difficult to integrate in certain electronic processes.

There are at least two other reasons why the present CEA approach and architecture is superior for measurement of weak optical signals. These have to do with the interplay of effective input noise to the bandwidth of the amplifier and either the capacitance of the photodiode or its shunt resistance. For silicon or other photodiode photodetectors with high shunt resistance in hundreds of kΩ, increased capacitance of the photodiode leads to increased input noise. This follows from standard noise theory of transimpedance amplifiers connected to the photodiode, like the ones shown in FIGS. 6A, 6B. For weak scattered light, larger area photodiodes collect more photons and thus improve the signal. But this can be useful only if noise does not increase rapidly. As the photodiode capacitance increases with increasing area, at some point, the SNR improves very slowly compared to the cost of the large area photodiode. This trade-off occurs at a much lower capacitance and hence much smaller area for the TMEA approach, or any pulsed architecture, as compared to the CEA approach, due to the lower bandwidth of the CEA approach. This means that the CEA approach and architecture wins significantly in performance by being able to collect more photons—owing to larger allowed photodiode areas—and starting with lower noise such as described above.

For measuring glucose or other target molecules using illumination light in the SWIR or for sensitive gas detection in MWIR or LWIR, the available photodetectors have very small shunt resistance (or large dark current) owing to a smaller bandgap to measure higher wavelength photons. The photodiode shunt resistance decreases with ambient temperature and decreases with the increasing size of the photodiode. Depending on the area of the photodiode and its bandgap, the shunt resistance ranges from a few kilohms (kΩ) for SWIR to 10 s of Ohms in LWIR. The input voltage noise un of the amplifier becomes an effective current noise $i_{nv}$ from Ohm's law:

$$i_{nv} = \frac{v_n}{R_{shunt}}.$$

Another aspect of improved performance for the present CWEA approach and architecture comes from lower effective input resistance at lower signal frequencies. The effective input resistance of the amplifier is $$R_{in} \sim \frac{R_f}{A(\omega)},$$

Where $A(\omega)$ is the open loop gain of the amplifier. The photodiode acts as a current source and the input resistance of the amplifier divides the current that flows into the amplifier by $$i_{amp} = i_{pd} \frac{R_{sh}}{R_{sh} + R_{in}}.$$

Thus, for IR measurements, it is better to use very low noise amplifiers with high gain bandwidth product and to operate them at lower frequencies. This combination can help reduce or minimize complex drifts in the measurement as the photodiode shunt resistance changes with temperature and bias conditions. The present CEA approach and architecture again meets these important specifications for providing stable measurement.

The leakage current and other phenomena (traps, crystal defects, poor ohmic contacts) can give rise to excess low frequency 1/f noise. For low power CMOS electronics, the 1/f noise corner can be easily in 10 s of kHz range. The ON-OFF measurement approach described herein can provide some relief from this 1/f noise as well as from ambient light. But any rapid changes in the ambient light may not be canceled by ON-OFF operation. For the CEA approach, the modulation frequencies can be placed anywhere along the frequency axis. For example, the modulation frequencies can be selected to be at frequencies that are close to and above the 1/f noise corner frequency to completely avoid the impact of 1/f noise and other interference sources. For example, some photodetectors may have 1/f noise corner frequency of a few Hertz while some SWIR and MWIR photodetectors can have a 1/f noise corner frequency that can be in a tens of kilohertz range. Similarly depending on the semiconductor material or process used, as well as the design of the electronics, 1/f noise of the overall circuit can also be in a few Hertz to few tens of kilohertz range. In many examples, modulation frequencies can be set in the range of a few kilohertz or higher than the 1/f noise corner frequency to avoid many 1/f noise sources. For some imaging applications, modulation frequencies can be much lower due to lower frame rate of the imager, but in that case, 1/f noise suppression can be performed using techniques such as correlated double sampling in the focal plane array read-out circuits. For the CEA approach, modulation codes can be employed that perfectly cancel all ambient light interference-including light interference at the modulation frequency.

FIGS. 7A, 7B, and 7C illustrate examples of amplitude vs. time and corresponding amplitude vs. frequency signal plots for modulation using modified sinusoidal modulation functions to provide a very good immunity to ambient light interference even when the ambient light interference frequency lies very close to or is even equal to one of the modulation frequencies. This can be accomplished because the entire system 1000 (including both the illumination/transmit side and the detection/receive side) can be locked to the same internal shared common clock, with the system 1000 having both knowledge of and control over when the modulation code sequence starts and ends.

FIG. 7A shows an example of a signal plot for two consecutive modulation sequences for 8-LED waveforms (but which can be applied more generally to any number of LEDs or modulated channels) together with the corresponding subsequent demodulated spectral components as demodulated by the demodulator 1014. To illustrate the point, it can be assumed that in every received spectral channel there is equal power and a new modified sequence. In the case illustrated in FIG. 7A, there is no ambient light interference, and the spectrum is "flat". FIG. 7B shows an example that is similar to that shown in FIG. 7A, but for which ambient light or electrical noise has been added at one of the modulation frequencies (corresponding to the modulation frequency of the third LED (LED3) of the eight LEDs being used and modulated in this example. In FIG. 7B, it can be observed in the demodulated spectrum that the demodulator 1014 cannot distinguish between the light from LED3 and the ambient light if they share the same code or modulation frequency.

FIG. 7C shows an example that is similar to that shown in FIG. 7B, but in which the modulation codes have been modified such that alternate code sequences are 180-degree out of phase, thereby producing codes that are alike except with opposite phases. Thus, for the signal plots of FIG. 7C, the output of each LED at the start of each code sequence is T-shifted. Because the entire system is synchronous and the system 1000 specifies the modulation sequence and, therefore, has knowledge of the start of the modulation sequence, the demodulator 1014 can first apply and flip the received data to account for the deliberate 180 degree phase shift in alternating code sequences by alternatingly flipping the sign of the digitized data. Then, the response data corresponding to the alternating code sequences can be added. In so doing, the response light corresponding to the LED outputs will now be added together, but the external interference will be subtracted. To the extent that the external interference is relatively constant over the two code periods corresponding to the two code sequences (one sign-inverted from the other), the effect of the ambient light interference will be cancelled, such as shown in the demodulated output spectrum of FIG. 7C. This is just one of many possible strategies enabled by the present CEA approach and architecture.

Another possible strategy enabled by the present CEA approach and architecture is to phase modulate the shared internal common clock to achieve the same outcome, since under the digital control of the present CEA approach and architecture, the production and coding of modulated illumination and the demodulation and decoding of response light are locked to the shared internal common clock, but the external interference is not. Also, the modulation frequencies can be selected or adjusted such as to use a frequency region that is relatively free of ambient interference, either statically or dynamically, e.g., based on a measurement of interference across frequencies that can then be used to select the frequency region that is relatively free of ambient interference. These types of modified sequences are very useful because they also cancel internal electronic noise coupling that invariably occurs in compact wearable and other devices.

Certain other codes can also be useful. For example, we can use the properties of circulant codes to generate modulation functions for the generator 1004. But we go one step further and use these circulant matrices as an envelope of the carrier modulation for the LEDs with the same or different carrier frequencies. By using a carrier frequency for each LED we can help provide immunity to 1/f noise and ambient noise sources, and further suppression of interference such as by using phase shifting techniques described above.

Figure 8B:
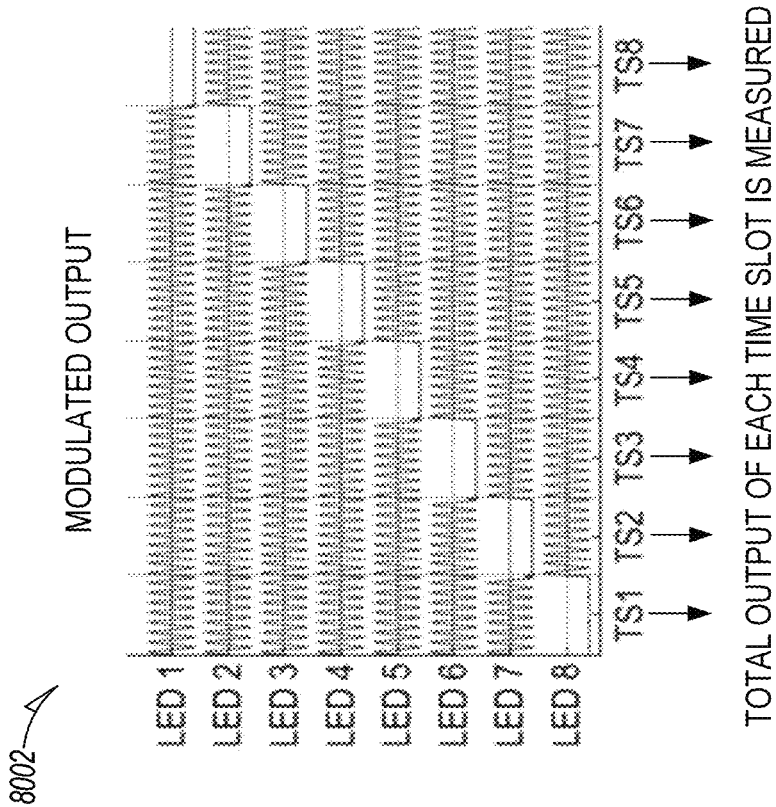
FIG. 8B shows an example illustrating conceptually light modulation of various channels over various time slots, corresponding to the modulation schema illustrated in FIG. 8A.
Figure 8A:
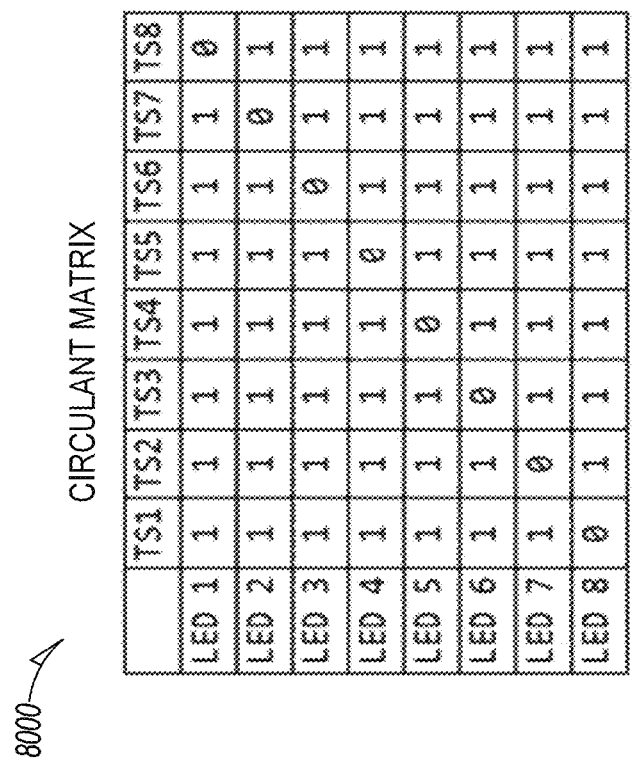
FIG. 8A shows an example of a square table illustrating an example of a circulant matrix.

FIG. 8A shows an example of a square table illustrating an example of a circulant matrix $C_8[l, t]$ at 8000. In this square matrix of FIG. 8A, different LEDs are represented by the row index l and the measurement of each time slot (TS) is represented by the column index t. The value of "0" represents the OFF state of the LED while value of "1" represents ON state of the LED. The ON state of the LED may be just a constant LED output over the time denoted by "1" in the matrix, or represented by a modulated ON state as shown in FIG. 8B, which shows an amplitude vs. time signal plot for each of the eight LEDs over the eight time slots, with each LED having a corresponding carrier input signal modulated as shown in 8002 according to the value of $C_8[l, t]$ shown in FIG. 8A. The demodulator 1014 demodulates the carrier for each time slot and produces a single value of the total light received in each TS. We can write this measured response light output vector m as a matrix equation with vector a as the unknown received response to illumination by each of the LEDs as:

$$m = C_8 a$$

This equation can be inverted easily, since $C_8$ is invertible square matrix, such as to recover the amplitude vector a. Note that immunity to 1/f noise and various other noise sources can be preserved by modulating such noise to the carrier frequency. As explained above, ambient noise or interference at the carrier frequency can be removed or attenuated by alternating the phase of the carrier and adding two consecutive code sequences together after digitally flipping the sign. In the case of these modified circulant codes that includes a carrier frequency during the ON phase, one may view this as two modulation stages. In the first stage, all currents to the LEDs are modulated at the carrier frequency and then, in the second stage, a digital operation further modulates the envelope of the carrier according to the "1" or "0" values in the circulant matrix for each time slot. Furthermore, consecutive sequence pairs can be provided in which the carrier phase is alternated between 0 and π such as to help remove ambient interference, such as explained above.

There are many possible codes that allow for combination of different sinusoidal modulation for each LED as described earlier and circulant codes to optimize noise and balance the overall system. For example, consider measurement over $N_\lambda$ modulated optical channels at different corresponding light wavelengths. Some of the wavelengths may be particularly weak. For example, there could be low LED illumination output at those wavelengths, low photodetector responsivity or excess photon absorption at those wavelengths. In an example, the LEDs can be divided or batched into multiple batches or banks, such as to which LEDs can be respectively mapped or assigned, such as based on light source signal intensity. For example, there may be two banks-weak signal-strength LEDs $N_w$ and strong signal-strength LEDs $N_s$ such that $N_w + N_s = N_\lambda$. The weaker bank can be measured for a longer time using CNW circulant codes and the stronger bank can be measured for a shorter time using $CN_s$ codes. Another possibility is to operate the two banks with two very different carrier frequencies while each bank can be measured using circulant codes.

FIG. 9 is an amplitude vs. frequency graph illustrating conceptually an example of the output spectrum of the modulated optical channels. For sinusoidal modulation of $N_\lambda$ channels, all the modulation frequencies can be upshifted to some very high modulation frequency. In case of the electro-optic (EO) modulators 4006 shown and described with respect to FIGS. 4A, 4B, the modulator driver can additionally provide high modulation at tens to hundreds of MHz or one can directly modulate the broadband light source 101 at such high frequency while operating the bank of EO modulators that provide sinusoidal or circulant modulation, such as described earlier.

An example of the output spectrum of the modulated optical channels is shown in FIG. 9. The phase of the received light will be different than the phase of the output illumination light, depending on the travel time, and this phase can become a substantial fraction of the period at higher frequencies and, therefore, becomes easier to measure. The measurement of travel time is useful for both an imaging application, which measures distance to the target object for each of the angular directions, or in spectroscopy, in which delay in scattering media can help provide insight into the scattering processes. If each of the incident illumination wavelengths is pumped into a chromophore for fluorescence, then depending on the relaxation mechanism (e.g., fluorescence scattering, Raman scattering) to such pumped excitation, different wavelengths can produce different fluorescence time, which will manifest as change in phase of the wavelength-shifted response. This fluorescence response or a Raman spectrum response technique can also be used as a sensitive probe of changes in the molecular composition of the medium.

Some examples of various types of modulation codes and techniques are listed below:

(1) In Example 1, the respective optical excitation channel outputs can respectively include different frequencies of triangular, square, or highly distorted sinusoids. Because all codes are limited to respective modulation frequencies that are between $f_0$ and $2 f_0$, higher harmonics due to distortion do not interfere with the response measurement.

(2) In Example 2, the output currents or voltages can be driven with a sudden 180-degree shift in the pattern every alternate code period, $T_{seq}$, and then demodulated accordingly as a pair to remove effects of ambient interference.

(3) In Example 3, the master modulation clock can be chirped or varied in time, such as to average out effects of one or more external sources, which does not affect the operation of the entire CEA. This phase-modulated approach can produce a chirped or variable frequency output, as measured by external clocks, but will remain unchanged with respect to internal time kept by the common master clock.

(4) In Example 4, the output current or voltages can include or consist of a combination of properties of circulant matrices, as well as employing modulation such as described in and with respect to FIG. 8.

(5) In Example 5, a combination of high frequency modulation and low frequency modulation can be employed, such as to measure distance or phase response of the system 1000, such as for each distinct spectral bin as described in and with respect to FIG. 9.

(6) In Example 6, many of these modulation codes can be combined and dynamically changed, such as to help suit needs for a particular application.

To sum and recap, the basic architecture for the electronics can be directed towards reconstructing one or more spectra transduced by one or more photodetectors from the modulated light. The entire system 1000 can be configured to operate using a shared "common" modulation clock, such as to help keep the transmit-side modulation generation and the receive-side demodulation in synchronization with each other. Some of the receive channels may be referred to as "reference" spectral channels, such as can be used to measure the modulated light as prepared for illumination spectra and measured before or without interaction by the target. Others of the receive channels can be configured to measure light transmission, scattering, or reflection of the target. With the present approach, there is really no limit to the number of photodetectors that can be employed, such as to concurrently form multiple spectral outputs representing different aspects of light interaction with the target. Thus, if the commonly shared master clock is locked to the frame rate of a camera or focal plane array (FPA), then every pixel can be demodulated such as to provide a hyperspectral image stack. While this document often mentions using an LED as an example of a light source, such an LED can be replaced with an electro-optic or a MEMS modulator or a super luminescent LED or a laser. The change in the type of modulator or light source merely changes the specifications or parameters for the driver used to energize the modulator or the light source, but need not impose any change on the architecture itself. One characteristic of certain modulation codes is that multiple optical excitation channels can concurrently be active at the same time and that the demodulator block 1014 can be configured to mathematically separate the response to these multiple excitation channels that may correspond to wavelength bins or to angular bins, such as described in the above-incorporated Deliwala U.S. Pat. No. 11,704,886.

A summary and recap of some types of modulators is provided below. In an example, photonic integrated circuit (PIC) modulators can be provided, which can include or consist of one or more of Mach-Zehnder or similar interferometric structures, electro-absorption modulators, or ring resonators that change the resonant frequency. These may be tuned, such as to account for one or more of local temperature effects, carrier injection, or change in band gap. PIC waveguide modulators may be provided with a separate broadband or other light source to be modulated. In a W-CLS configuration, the system 100 can be configured to be operable using a single input light source, the illumination light from which can be spectrally separated and modulated using multiple excitation channels. The spectral separation and combining after modulation can all be performed on the PIC. In an S-CLS configuration, the system 100 can be configured to be operable using a single input light source, the illumination light from which can be split into multiple beams, such as can be respectively provided to corresponding individual ones of multiple excitation channels. In either configuration, the outputs of the modulation generator 1004 can provide a modulated electrical current to energize and directly modulate the light output of one or more LEDs, SLEDs, or lasers.

Examples of Potential Advantages of the CEA

This section explains some examples of potential performance and other advantages of the CEA approach described herein.

First, the present CEA approach can help provide improvements with respect to statistical noise and interference. As explained above, the present CEA can offer lower noise bandwidth. Ambient interference can be completely avoided, such as using various coding techniques as explained above. Further, the modulation frequencies can be selected so as to reduce or completely eliminate 1/f noise. As explained above, the lower amplifier bandwidth needed by the CEA approach relative to a time-multiplexed TMEA approach results in a lower noise penalty for using high capacitance photodetectors. Amplifier noise is also effectively lowered due to the CEA approach's ability to employ higher gain at a location in the signal path before the ADC.

Second, the present CEA approach can additionally or alternatively help provide one or more signal improvements. For example, the present CEA approach can operate with low requirements on peak power. As explained above, a lower continuous illumination power output can provide the same or greater number of photons over a particular modulation code time period $T_{seq}$ depending on the type of light source. The peak power to produce the same number of photons in the time-multiplexed TMEA approach vs. the average power of the present CEA approach is given below:

$$P_{peak} = 2 N_\lambda P_{avg}$$

This may not be a problem when attenuation through the target tissue or scattering media is small, and light sources may be capable of providing the peak power required by the time-multiplexed TMEA approach. But it becomes highly limiting—especially in the infrared region—where high peak power is very difficult to achieve due to limitations of technology. The high peak power can often stress driver components as well as the light sources, due to corresponding high drive currents, and can also produce large electrical interference. The transient changes in the temperature of the LEDs due to high peak current can change the instantaneous LED output spectra (thereby degrading spectral measurement) or it can produce complex output waveforms (thereby adding variability to the signal measurement). These effects of high peak power can act like systematic noise present during system operation.

For the present CEA approach, signal power at the photodetector is the sum of all light that is received from all of the optical channels. Thus, the total power at the photodetector can more easily be made larger than the irreducible shot noise of the photon detection. Accordingly, using the present CEA approach, measurement of detected photons can be greater than the noise of the photodetector and the amplifier signal chain provided to help signal-process the resulting transduced electrical signal. This means that, for the present CEA approach, the uncooled photodetector performance can be comparable to that of using a cooled photodetector in the infrared regions, thereby helping avoid the expense, complexity, and increased power consumption of using a cooled photodetector. As also explained above, the capacitance penalty of using large photodetectors is reduced by the present CEA approach (owing to its smaller bandwidth requirements). Thus, the present CEA approach can help allow for larger or cheaper photodetectors, which, in turn, can help further increase the collected response signal to the coded illumination.

Third, the present CEA approach can help obtain a reduction of motion artifacts, which can be especially for tissue target measurements. As explained earlier, illumination light of different spectral content can be directed into tissue for noninvasive measurement of an in vivo target location. Resulting changes in the response spectra after reflection by or transmission through the target carries information about the chemical composition and physical state of the target. The illumination light is scattered by heterogeneous structures in the body, which structures can range from nuclei of the cells to various types of cells as well as blood. All of these different scatterers are in different states of micro-motion. Such micro-motion of the various scatterers can cause the trajectories of the photons to change in a random or randomizing fashion. Indeed, it is the scattering process that yields information about the tissue target via optical interaction, but such scattering also generates time-varying random or randomizing changes in the signal. If different spectral components are presented at different points in time—as would be the case in a time-multiplexed TMEA approach—then it follows that the scattering process will be microscopically different, which changes both the number of photons reaching the photodetector and their effective optical pathlength. Together, this gives rise to variation in the measured response spectrum. This is true even if the subject is asked to be motionless, since being motionless does not stop blood flow or micro muscle twitches and myriads of active processes in the patient's body. There are only two possible solutions: present all the wavelengths at the same time or measure incredibly rapidly in sequence. But, as explained, the rapid time-multiplexed measurements will only increase the system requirements on peak power to reach the same SNR, since with rapid time-multiplexed measurements the input-referred noise floor will increase and the impact of the capacitance of the photodiode will limit the size of the photon collection area of the photodiode.

By contrast, the present CEA approach permits concurrent measurement of the response to illumination using all of the concurrently modulated wavelengths while collecting many scattered photons using large area photodetectors. The present CEA approach and its accompanying optical system allows all the different concurrently modulated illumination wavelengths to be concurrently incident on the tissue at the same location.

Figure 10A:
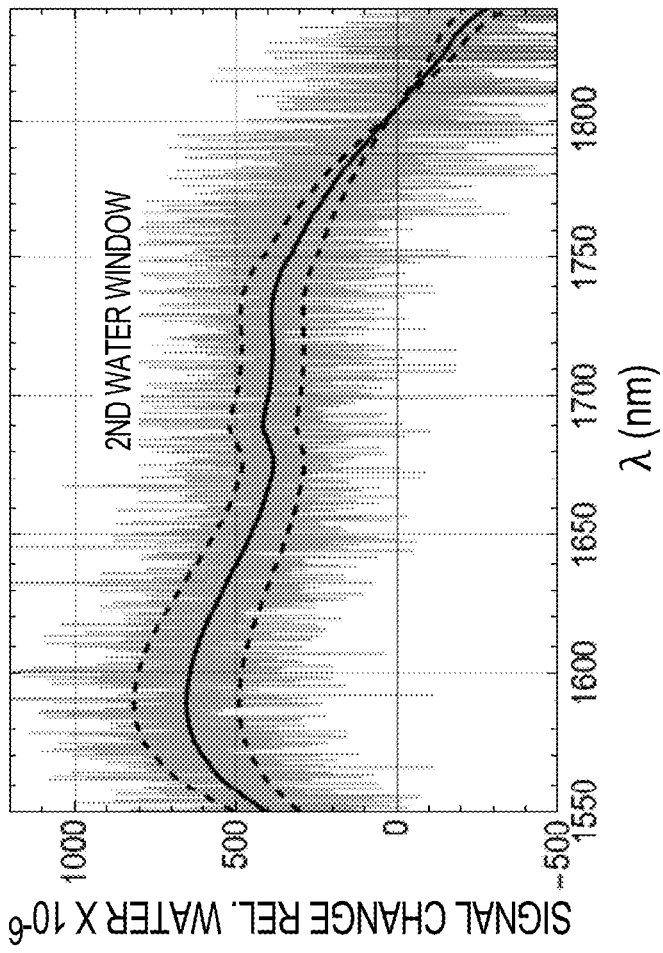
FIGS. 10A, 10B are computer-simulation graphs illustrating examples of simulated signal change (relative to water) vs. wavelength comparing a time-multiplexed TMEA approach (FIG. 10A) to the present concurrent light modulation CEA approach (FIG. 10B) for spectral measurement of glucose in the so-called "second infrared" window.
Figure 10B:
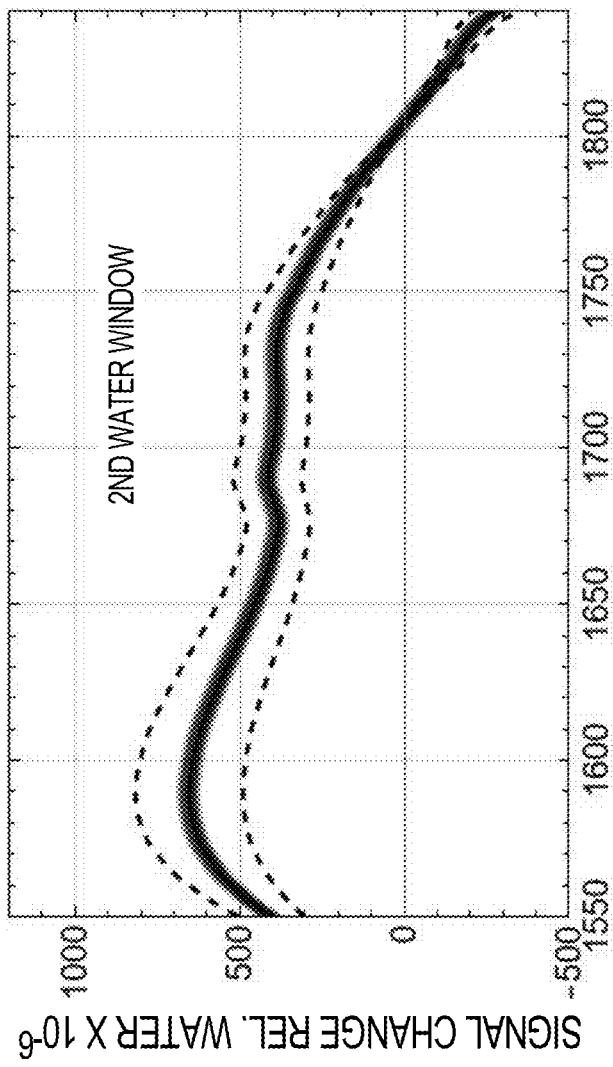

FIGS. 10A, 10B are computer-simulation graphs illustrating examples of simulated signal change (relative to water) vs. wavelength comparing a time-multiplexed TMEA approach (FIG. 10A) to the present concurrent light modulation CEA approach (FIG. 10B) for spectral measurement of glucose in the so-called "second infrared" window. The solid line represents the expected change in the response signal vs wavelength for a typical glucose concentration of 80 mg/dl with dashed lines showing changes due to ±20 mg/dl of glucose concentration. The expected SNR level that would allow one to measure this level of spectral change is about 70-80 dB.

FIG. 10A shows the results of the computer simulation assuming that, as the wavelengths are scanned in a rapid time-multiplexed fashion, a very small change in the optical path length of 100 nm occurs in a random fashion due to scattering. These motion-induced spectral changes cannot be "averaged away" since the state of the cells and scattering structures in the next scan may be totally different. FIG. 10A shows the results of the computer simulation using the present coded modulation techniques of the present CEA approach, with similar increases in the optical path length as FIG. 10A, but assumes that these changes are measured by all the wavelengths over the same integration time of the coding period $T_{seq}$. This effective averaging makes the relative changes smaller. Further, as discussed in the above-incorporated Deliwala U.S. Pat. No. 11,704,886, the disclosed optical system can ensure both accurate wavelength filtering from each individual one of the LEDs and that all the illumination light wavelengths can enter the body at virtually exactly the same location, thus helping in reducing or eliminating effects of spatial variability.

Examples of Results From Prototype Testing

An illustrative example of a prototype of the system 1000, such as shown and described herein with respect to FIG. 1, was constructed using discrete, readily available electronic components, such as microcontrollers, ADC, DAC, operational amplifiers, and other similar electronic components. The system 1000 can be modular. The receiver 1010, ADC 1012, demodulator 1014, and receive-side signal-processing and analysis performed by the processing unit 1002 can be configured to work with any form of modulation coding of multiple channels of illumination light with specified coding functions. As explained above, the shared master clock is passed from the illumination producer side of the processing unit 1002 to the receive-side of the processing unit 1002 (or vice-versa) to permit synchronous modulation, demodulation, and operation of both illumination producer and receiver sides of the system 1000.

We will briefly outline some of the key values that are chosen for various electronic circuit elements of the present CEA. Various electronic and digital filters along the entire signal chain from digital generation of modulation to DAC output to LED or modulator drive to receiver design and time-domain digital filtering of oversampled ADC samples are configured to reduce overall noise from various sources and clean up modulation waveforms for digital demodulation.

The master clock is configured to oversample the receiver signal by ADC 1012 at 8 times (8×) to 16 times (16×) the highest fundamental modulation frequency, since the prototype used sinusoidal signals as of different frequencies as orthogonal codes for encoding the light with modulation functions (e.g., that can be orthogonally modulated with respect to each other in terms of at least one of amplitude or phase) corresponding to individual channels. Similar reasoning applies to configuring the DAC 2000 to produce a clean output with at least 4× to 16× oversampling of the output codes.

Starting with the transmitter, the DAC output is filtered by gain and filter "driver" circuitry 2004 to remove higher harmonics of the signal generation in the analog signal chain before presenting the output to the LED or SLED or other electrical-to-optical converter 1006 in order to provide mostly sinusoidal output. The low-pass corner of this filter of the driver circuitry 2004 can be set above the highest modulation frequency of that particular modulation channel of the system 1000. This allows for a relatively simple and lower bit depth DAC 2000 to produce a higher quality modulation signal. A DAC with 12-bits or more of resolution is quite useful in practice as it allows for digital control of the amplitudes and equalization. Similarly, the receiver bandwidth is restricted by analog filters, such as highpass or bandpass filters can be included in or coupled to the signal-conditioning amplifiers 2012, before presenting the transduced electrical signal to the respective ADC channels of the ADC 1012. The receiver 1010 itself also removes low frequency with the high pass corner frequency of the amplifier 2012 in FIG. 6B set below the lowest modulation frequency of that particular channel. Since most photodetectors 2010 and many of the CMOS electronics can be configured to have 1/f noise corner in a few kHz range, the lowest modulation frequency of a particular channel can be selected to be just above the corner of 1/f noise of that particular channel. Thus, because particular channels correspond to particular wavelengths or wavelength groups, wavelength-dependent feedback or per-channel control can be particularized for a given channel. For example, the combined low-pass corner upper frequency from all the low-pass filters in the system 1000 was kept around 15 kHz for the prototype described but it can be adjusted in various implementations, but should be at least higher than $2(N_\lambda R)$. Reducing this upper frequency can help lowers the TIA bandwidth requirements of the amplifiers 2012 and, in many cases, improves performance with large photodiodes 2010 with high capacitance as well as allowing for maximum oversampling by the ADC 1012 to help reduce or eliminate the impact of the ADC's noise.

The experiments described herein included two separate measurements on the skin: (1) one in the region of the second shortwave infrared (IR) window that is considered useful for measuring glucose, alcohol, or lactic acid; and (2) the other in the visible/near-infrared window to measure tissue components including oxygenation state of hemoglobin.

A photoplethysmogram (PPG) spectroscopy measurement entails measuring small changes in the light scattered back from the tissue due to changes in the optical path of the photons induced by the beating of the heart. This PPG measurement can be performed by devices that can include a blood oxygen monitor in a doctor's office as well as the heart measurements performed by smart watches.

Most PPG spectroscopy measurement implementations use few wavelengths, e.g., just one wavelength for PPG spectroscopy and just two wavelengths for blood oxygen measurements, using powerful LEDs to illuminate the skin. U.S. Pat. No. 9,341,565, assigned to Masimo Corp., uses many more LEDs, but does not employ the coded modulation and demodulation such as described herein. By using the present CEA approach and optics, extremely stable and almost motion free spectral measurement of the tissue can be obtained, as well as very stable pulsatile pattern across all the wavelengths. Thus, the present CEA approach presents the first commercially implementable reliable measurement of the "non-pulsatile" or "DC" component of blood that can extract state of oxygenation of the tissue and/or venous blood, effective path length from water absorption feature and more by fitting the spectra to spectra corresponding to specified components of the tissue.

Figure 11A:
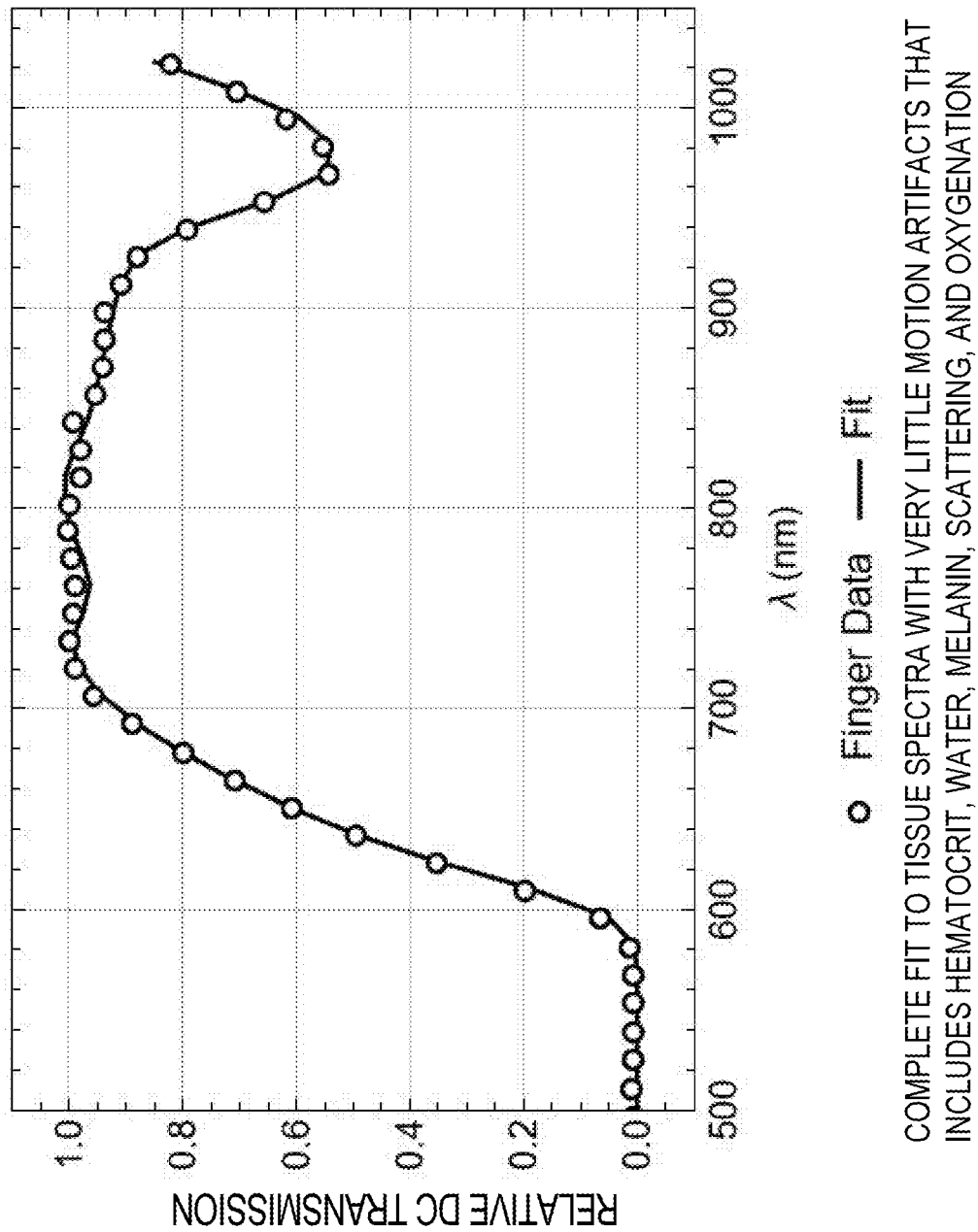
FIG. 11A is a graph showing an example of relative DC transmission vs. wavelength.

FIG. 11A is a graph of a "DC" transmission spectrum through the finger. The actual data points and the fit are shown. The graph is automatically normalized by using the internal reference detector, and thus represents the attenuation of different optical wavelengths through the tissue. Even though photons of different wavelengths scatter differently, since all the incident photons start from the same input illumination entry location and the entire spectra is measured over the same integration time, excellent stability of the spectra is observed. The spectra itself has small variation in its transmitted intensity due to pulsatile blood flow in the arteries. The steady "DC" spectra is relatively free of motion artifacts and allows fitting of the spectra to the known properties of the components of the tissue, including melanin concentration, fraction of blood volume, oxygenated and deoxygenated blood fractions, total water, fat, and wavelength dependent scattering, as shown by the solid line. Note that there is a dip in FIG. 11A at the water absorption wavelength around 940 nm. This absorption provides the effective optical path length that would have produced the absorption. By measuring such response spectra at two or more locations different from the incident illumination light entry location, one can potentially extract wavelength dependent scattering and absorption changes, which may be correlated to core temperature, hydration, and more.

Both core temperature and hydration information can be determined using information obtained from illumination response spectra from the target associated with a water absorption component of the response spectrum of the target. Changes in the shape of the water's absorption peaks at 940 nm, 1430 nm, 1920 nm, etc., are documented. Thus, precision spectroscopy of water's absorption peak with photons that travel many millimeters or centimeters into tissue can be used to determine the temperature of such deeper tissues. In practice, the spectra can be calibrated such to account for impact all the different materials in tissue. Hydration depends on the relative proportion of water in different compartments of the body, such as intracellular space or extracellular space, relative to the ionic concentration of salts. Thus, hydration can also be determined using an appropriate spectroscopy protocol and distinguished from core temperature or other physiological parameter(s) that are based on spectral absorption peaks of water in tissue. Further, changes in hydration state may result in changes in the scattering properties, which can be measured spectroscopically. The temperature detection techniques described herein are not limited to tissue temperature of a human or other subject, but can be employed in a wide variety of uses cases in which the temperature of a material can be measured via one or more spectral changes.

Figure 11B:
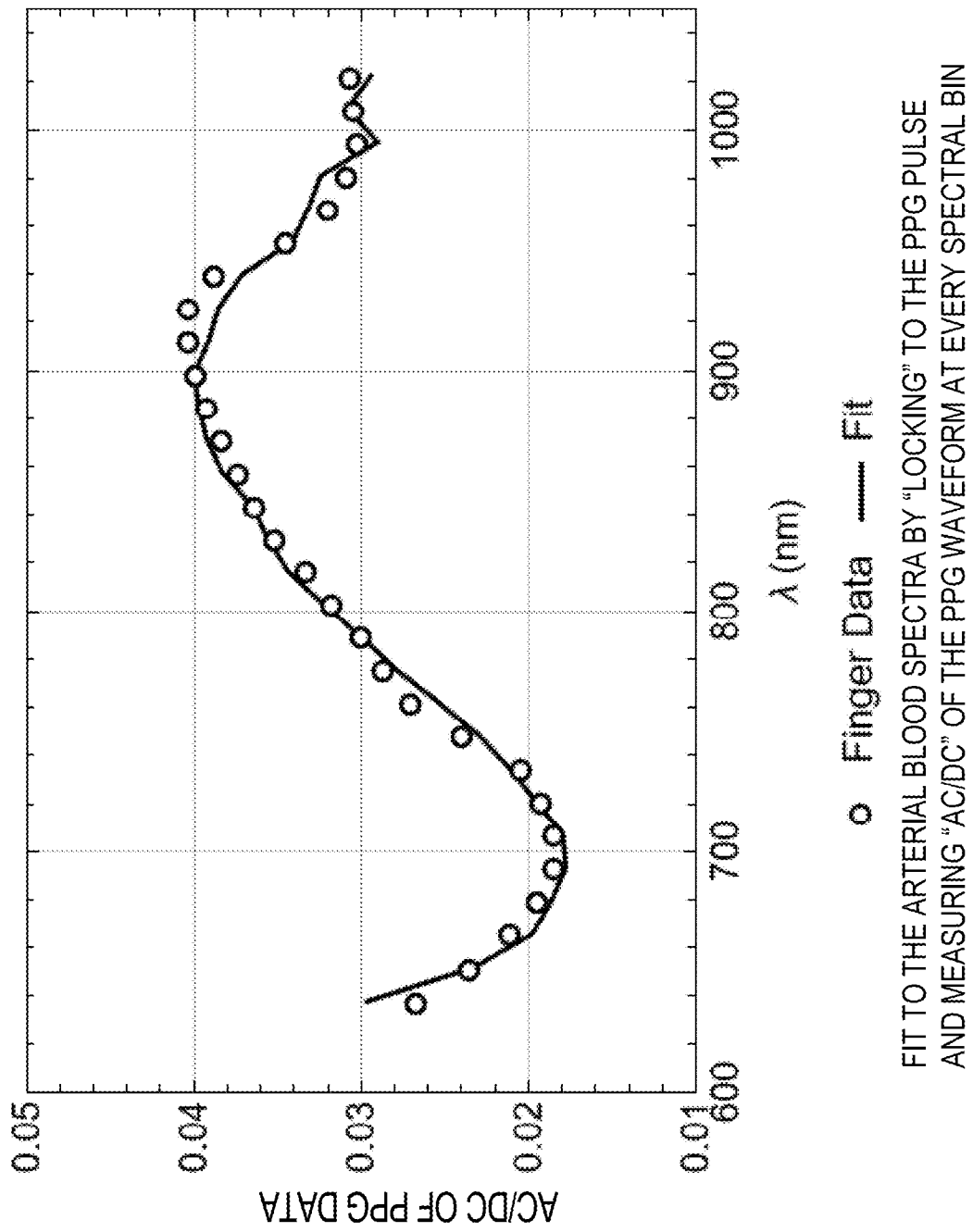
FIG. 11B is a corresponding graph showing an example of fitting of a desired parameter (e.g., arterial oxygenation, hematocrit, etc.).

The pulsatile component or the "AC" component of the spectra at each wavelength is also extremely steady and allows fitting of arterial oxygenation as well as one or more other components of the blood, such as total hematocrit, which is shown in the graph of FIG. 11B. Changes in tissue and arterial blood oxygenation can potentially shed light on various metabolic processes. For example, an HbA1c level of hemoglobin can be measured based on measuring the spectral changes in hemoglobin. Precision spectroscopy of the tissue-both PPG and the static result of scattering and absorption, can yield far deeper insights into various aspects of physiology, which may include: the state of hemoglobin oxygenation in the arterial blood as well as in the tissue, tissue temperature via water absorption changes, measurement of fat, changes in the scattering properties, which, in turn, may be a result of changes in the hydration level, and much more.

Notably, the fit shown in FIGS. 11A, 11B includes the melanin concentration and thus skin type can be determined based on the melanin concentration. Doing so can help facilitate correct estimation of $SpO_2$ without racial bias owing to differences in skin type. Due to strong light absorption by dark skinned people, certain $SpO_2$ techniques may provide a systematic bias in estimates of $SpO_2$. This has been identified by the U.S. Food and Drug Administration (FDA) as an unmet need for which new and improved techniques are desired to get better measurements over a wide variety of skin types.

Infrared Tissue Spectroscopy for Glucose, Lactose, Alcohol, Etc.

Noninvasive in vivo measurement of glucose, lactose, alcohol, or similar molecules can be incredibly challenging. Many such molecules have absorption features in the SWIR window. In fact, even though there is a huge unmet need for noninvasive in vivo measurement of alcohol or glucose etc., there has previously not been a practical approach of implementing optics and electronics to overcome the challenges posed by physics and physiology. Such noninvasive in vivo measurement applications can involve several challenges. For example, consider:

(1) The typical concentration of glucose and other molecules of interest is in the range of 20-500 ppm. Based on their spectra, this translates to a SNR requirement of 70 dB to 90 dB.

(2) The photodetectors for detecting in this wavelength region have a low bandgap. Therefore, they can suffer from large dark currents, strong temperature dependent drifts, low-frequency or 1/f noise, and high capacitance per unit area. These sources of noise will need to be removed to be able to reach the desired SNR.

(3) LED and other light sources have low quantum efficiencies, compared to visible and near infrared sources. LEDs can also have large wavelength and output power drifts as a function of temperature and input current. LEDs can further have limited peak powers. Large peak currents can make transient changes in spectra hard to quantify. This can lead to systematic errors in measurement. Thus, it is desirable to use an approach that can provide low-peak power drive of high efficiency, and essentially physics-limited signal extraction from a weak signal transduced at the photodetector, such as described or incorporated herein. It is also desirable to provide spectrally restricted outputs at specified wavelengths and the ability to easily calibrate the system "on the fly."

(4) It can be desirable to implement broadband spectroscopy capable of measuring 8 or even 32 or more spectral bins, which can be especially useful for concurrently extracting multiple different parameters, such as glucose, tissue oxygenation, hydration, core temperature, while removing the effect of skin color, skin texture, cosmetic or other contaminants, or the like. Furthermore, molecules such as glucose and alcohol have broad spectra in SWIR. Thus, a broadband measurement can be desirable to help separate the effect of changes in the water column from the effect changes in the concentration of the target molecule or analyte.

(5) Water absorption effects can dominate the measurement requirements of the target analyte. Changes in the water column as seen by photons, due to motion or otherwise, can translate to motion artifacts. In the SWIR wavelength window, where glucose and other molecules have substantial absorption, water still absorbs light. The effect of water absorption has to be separated from smaller changes caused by changes in the concentration of the target molecule or analyte.

(6) In-vivo spectral measurement should be carried out rapidly to help avoid or reduce motion artifacts. While homogeneous illumination and spectral control is accomplished by the photonic design, CEA helps reduce the motion artifacts as discussed earlier.

Overcoming the above challenges (1) and (2) has been described. These challenges can be met due to various advantages in the present CMEA approach, including in the configuration of optical receivers that allow for very low noise operation. The present CMEA approach using coded light allows using amplifiers, DACs, and ADCs for optimum electrical bandwidth, which, when taken together, can help provide almost 10 times to 100 times lower noise relative to the pulsed system time-multiplexed TMEA approach. The present CMEA approach can suppress 1/f noise from all sources, while boosting signal by allowing use of large area photodetectors without adding excess noise due to high capacitance or from low shunt resistance.

Challenge (3) can benefit from how the present CEA approach enables using low average power. Detailed optical computer simulations and physically building some of the optics, suggests that it is possible to deliver 1% of the light emitted by the light source to the in vivo or other target. For advanced silicon photonics or PIC based configurations, such as described herein, this may reach as high as 10-30%. The light sources themselves have quantum efficiencies of 10%-30%. Conservatively, for every electron injected into the light source by its corresponding driver circuit 2004, there will be $10\%*1\%*0.1\%=10^{-6}$ electrons received from the photodetector transducing the response light into electrical signal, which represents the net efficiency of the optical electrical system as measured by electrons injected into optical portion of the system 1000 to the electrons received back from the optical portion of the system 1000. Given the low shunt resistance of the photodiodes, and larger photodiode area of collection that can be provided using the CMEA approach described herein, an effective input-referred noise of 2-4 pA/rtHz is attainable. Thus, the input power specifications for light generation are:

$$P_{req} = 10^{\frac{80}{20}}(4pA\sqrt{01})*\left(\frac{1}{10^{-6}}\right)*N_\lambda \sim 15\text{mW}N_\lambda$$

It may be possible to improve the above number by factors ranging from 5 to 500 over time and with optimization of various optical and electrical components as well as advances in material science. Thus, the present CEA approach can meet the low-power challenge.

Challenge (4) can be met by the flexible choice of number of wavelengths and compatible optical designs described and incorporated herein, while maintaining spectral accuracy.

Figure 12A:
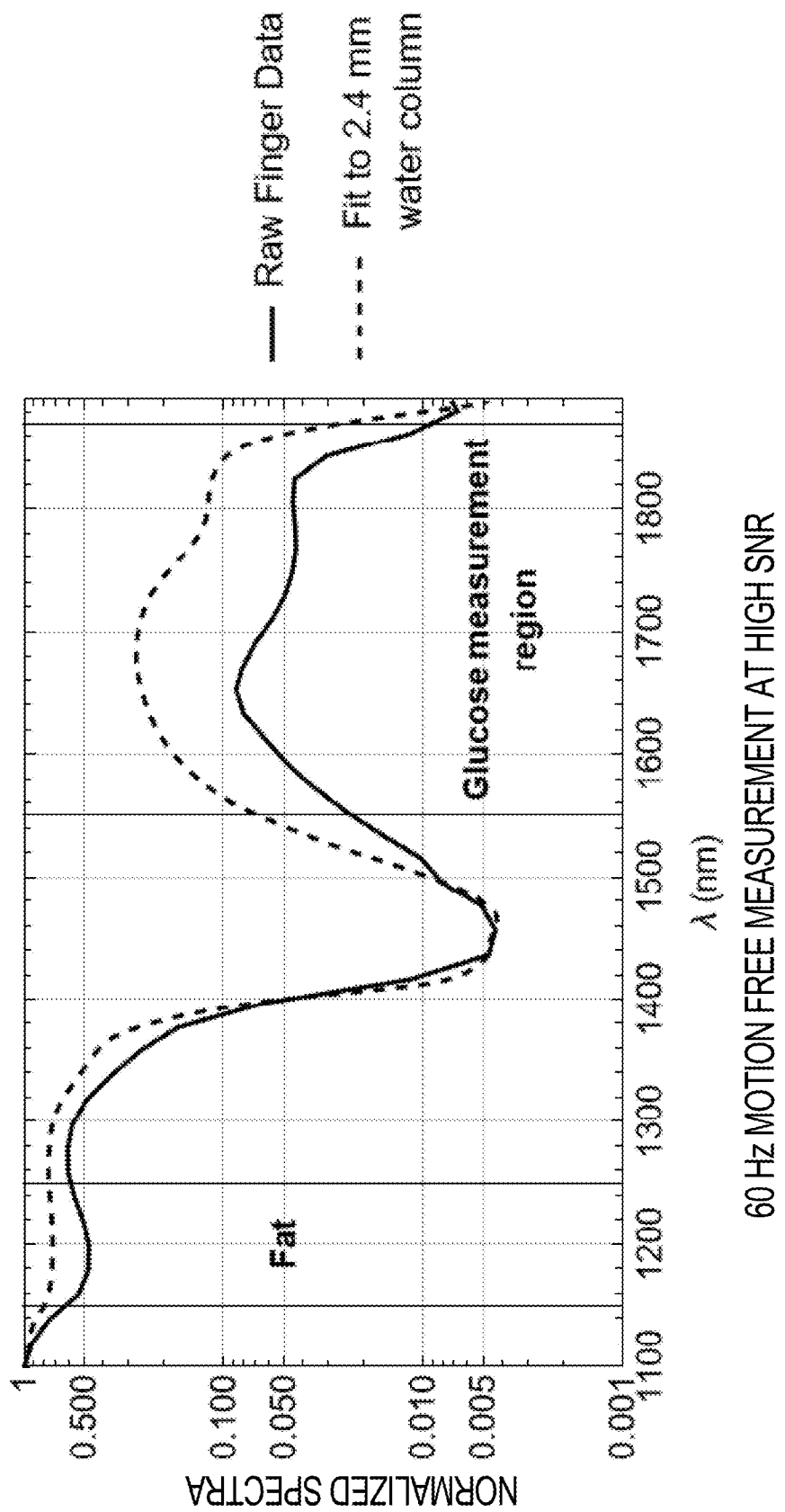
FIG. 12A is a graph of normalized spectral amplitude vs. wavelength of raw response spectrum from a human subject's finger as measured in the SWIR region.

Challenge (5) can be met by broadband spectroscopy that includes wavelengths with strong absorption around 940 nm (as shown in FIG. 11A) or at 1460 nm (as shown in FIG. 12A) or even stronger water absorption around 1920 nm. These water absorption features allow estimating photon path length in a target substance as well as monitoring changes in the absorption spectrum of water, which may help indicate both the presence of the target analyte as well as allowing measurement of temperature or one or more other parameters useful for accurate estimation.

Challenge (6) has proven difficult in a time-multiplexed approach-even with a rapid pulsed light sequence, but as explained above, including with respect to FIGS. 11A, 11B, the present CMEA approach is well-suited to suppressing motion artifacts by employing concurrent delivery of light that can be modulated by different coded modulation functions. All of these challenges can be shown to have been addressed.

FIG. 12A is a graph of normalized spectral amplitude vs. wavelength of raw response spectrum from a human subject's finger as measured in the SWIR region. In FIG. 12A, the dashed line in the graph corresponds to a measured response spectrum from a 2.4 mm long water column. The effective water column length is estimated by fit to pure water spectrum shown as the dashed line and provides a more accurate way to measure column density of analytes. In FIG. 12A, the solid line corresponds to a measured response spectrum from the human subject's finger. FIG. 12A indicates the "fat" measurement region of the spectrum between 1150 nm and 1250 nm and the "glucose" measurement region of the spectrum between 1550 nm and 1850 nm. In FIG. 12A, the prominent water absorption at 1460 nm can be observed, which allows measurement of the total path length and the transmission in the 1550 nm to 1850 nm window, in which many molecules of interest exhibit spectral features.

Figure 12B:
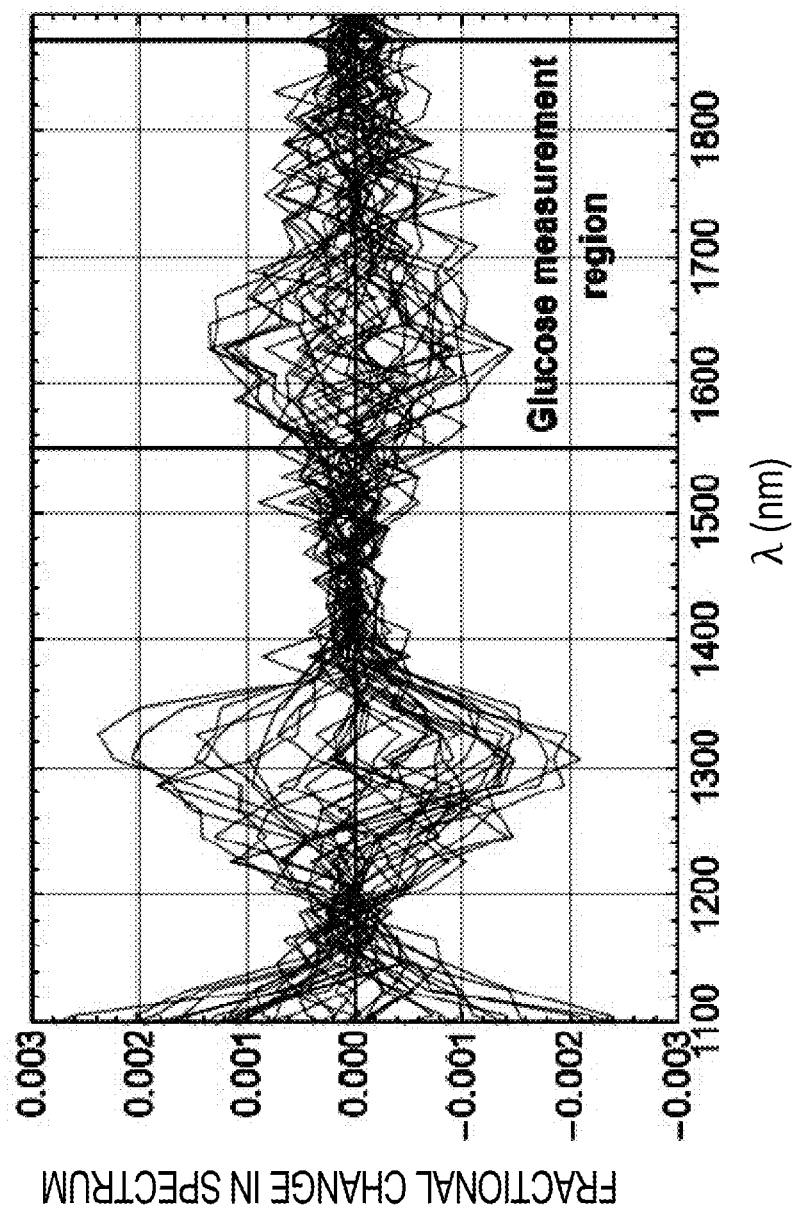
FIG. 12B is a graph showing an example of the fractional variation in the response spectra of the finger, over a time period of 60 seconds, versus various response light wavelengths from 1000 nm to 2200 nm.

FIG. 12B is a graph showing an example of the fractional variation in the response spectra of the finger, over a time period of 60 seconds, versus various response light wavelengths from 1000 nm to 2200 nm. The fractional variation shown with respect to the y-axis in FIG. 12B provides a measure of motion artifact suppression. FIG. 12B demonstrates that even for these initial rudimentary finger measurements, we have experimentally achieved stability of better than a few parts per thousand. This unprecedented stability—providing noise-immunity to motion artifacts that can otherwise be present due to sensor or other movement—can be improved further by improvements in one or more of the optical configuration or componentry, by improvements in the electronics configuration or componentry, as well as using real-time spectral analysis of optical path length by fitting to water absorption spectra or other features By continuously or recurrently monitoring the spectra at very high SNR, changes in the measured water absorption over short time can be assumed to be due to changes in the actual photon path due to motion of the source relative to the detector or due to internal motions. But these changes apply to all wavelengths with different but relatively fixed corrections due wavelength dependence of scattering and absorption. Thus, we can use the estimated optical path length variations to correct for the changes in the spectra due to some of the motions. Over a long term, tracking changes to the water spectra and other spectral regions the same analysis can be used to estimate the total changes in the water column as seen by the photons scattering from the source to one or more detectors. This may allow estimating changes in the scattering properties of the cells and thus allow estimating the state of some of the underlying metabolic processes such as intracellular water content vs. extracellular water. State of hydration changes the relative amount of extracellular and intracellular water content, scattering coefficient, as well as estimated strength of PPG pulse, and more.

In summary, by careful analysis of multi-wavelength, high-SNR spectroscopy data against clinical validation of various metabolic parameters, one can estimate many parameters of interest: $SpO_2$ (independent of skin color), $StO_2$, total hematocrit, state of hydration, core temperature, glucose, alcohol, lactic acid, core temperature, and much more.

Applications to Imaging

FIG. 13 is a schematic diagram showing an example of the system 1000 configured for employing the present CEA approach together with a Spatially Coded Light Source (S-CLS) 200 such as for use in an imaging application. In such an S-CLS approach, different modulation channels can be assigned to different illumination projection angles. Such different modulation channels may or may not correspond to different wavelengths of illumination light. A light source 1300 is split into multiple light sources by a light splitter 1302 and each of these multiple light sources can be individually modulated with respective unique codes by corresponding electrical-to-optical converters 1306, such as can include LEDs, SLEDs, PICs, or resonators, as explained above. The light scattered from different locations on the target object, each of which have unique codes, and the modulated outputs can be projected on the object by suitable illumination optics 1308. The response light from the target object can be collected by various photodetectors 2010A, 2010B, etc. and transduced into corresponding analog electrical signals, which, in turn, can be converted by ADC 1012 into corresponding digital electrical signals that can be demodulated by the demodulator 1014. The demodulator 1014 can include or can be coupled to the processing circuit 1002 or other signal-processing circuitry for reconstructing the image. The processing circuit 1002 can reconstruct the image, since the angle assignment of where the modulated light hits the object is determined by the projection optics 1308. The optical modulators 1306 can be configured to operate in a fashion similar to the ones described with respect to FIG. 4A, and can be driven by driver electronics 2004.

The present CEA approach can provide a low-cost imaging device in the IR wavelength range, in which focal plane arrays (FPAs) can be quite expensive. The illumination side of the system shown in FIG. 13 can include a reference channel that can employ a reference detector photodetector 2009, which can be arranged and configured to collect a reference component of illumination light that has not yet interacted with the target object. The reference photodetector 2009 can transduce this reference component of the illumination light into an electrical signal, which can be used to detect variations in the illumination light source or optics, which, in turn, can be used, e.g., by the processing unit 1002, for calibrating or compensating the system to account for such variations that are independent of and unrelated to the target object or its characteristics. After such calibration or compensation using the reference photodetector 2009 signal-processing circuitry in the reference channel, the resulting electrical signals transduced by the set of photodetectors such as 2010A, 2010B to potentially acquire images at different angles and can be used to generate a quantitative image of the target object from each of the photodetector outputs 2010A, 2010B etc.

Other Applications of CEA

While the above examples have focused on tissue measurements for healthcare, the present CEA approach has broad applicability, as the challenges with respect to power, cost, spectral stability, and high SNR are likely to be present in other applications as well. Virtually all of the applications and use cases described in the above-incorporated Deliwala U.S. Pat. No. 11,704,886 can benefit from the present CEA approach. To list some examples:

(1) Tissue measurement of one or more molecules and composition, such as can include measurement of glucose, alcohol, lactic acid, urea, HbA1c, oxygenation of arterial blood and tissue, core body temperature, hydration, fat, skin oils, and much more.

(2) Measurement of one or more environmental parameters such as stress or temperature, such as via a Fiber Bragg Grating (PBG) or using Fabry-Perot cavities.

(3) Lower cost optical coherence tomography (OCT) systems or thin film measurement systems.

(4) Application specific spectrometry such as for measurement of moisture, grain quality, dairy nutrition, plant health, semiconductor wafer thickness or the like.

(5) Measurement of gas concentration in an environment. Most gases of interest such as $CO_2$, CO, methane, formaldehyde, alcohol in the breadth, benzene, ammonia, and nitrous oxides have distinct vibrational spectra in the MWIR and the LWIR wavelength ranges.

a. The LEDs or SLEDs operating in the MWIR wavelength range are less efficient and have very broad spectra, and the photodetectors operating in the MWIR range have even lower shunt resistance. Using the same photodetector for measuring the entire spectra can help reduce or eliminate variations in responsivity, temperature dependence of many components, dirt on mirrors, and more. It can help allow for longer photon path lengths at lower cost and can help provide high SNR. Together with the present CEA approach, it can allow 50-100 ppm measurement in very compact package for low-cost measurement of methane or alcohol in breath, or a sub-ppm sensor for formaldehyde with a longer path length, but still small enough to fit in a small box.

b. The present CEA approach can be used for measurement of volatile organic compounds (VOCs) in the LWIR wavelength range.

(6) Application-specific hybrid imaging and spectroscopy.

a. Imaging sensor sensitive only to water. In an example, two nearby wavelengths, such as one at 1375 nm (no water absorption and highly attenuated sunlight due to atmospheric absorption) and the other at 1410 nm (stronger water absorption and little sunlight), are both modulated to and mapped to multiple projection angles to simultaneously form a corresponding image at each of these wavelengths. This can be accomplished by using two separate S-CLS sources operating at different wavelengths, or by using the same S-CLS source together with a modulator for which modulation codes map to both a specific angle and a specific wavelength group. By comparing the two images, such as by taking the ratio of the two images at two wavelengths, the system can positively identify water in the image since rapid changes in the spectral reflectance or transmittance corresponds to the water absorption. This can be useful for many automated robotic systems that need to accurately determine the presence of water puddles and take appropriate action. Note that we have chosen wavelengths that are not only sensitive to water but are also substantially attenuated by the atmosphere so that ambient interference from the sun will not overwhelm the photodetectors.

b. A floor painted with a paint or impregnated with material with specific characteristic absorption can be used as navigation marker for many robotic systems such as in warehouses. In many of these systems, navigation requires imaging at least a line image and identifying characteristic paint independent of the ambient light or presence of other colors on the floor. The method described for water puddle works well for this case too, with wavelengths chosen for the target paint. In this case, a target paint on the floor generates a unique signature that is spectrally distinct and spatially resolved to provide feedback to the navigation system. The update rates can be extremely fast with high dynamic range and full cancellation of ambient light can be done using disclosed modulation codes. This is simpler than using imaging or cameras that are slow and produce high computation burden. Thus a simpler navigation imaging sensor but without the burden of complex imaging system can be provided that is robust to ambient light as well as to presence of other colors.

c. Similar strategies can be applied to many variations of the present detection system and the present CEA approach, such as can be configured and employed for plastic sorting or local bandgap variation measurement or defect measurement in semiconductor wafers.

d. While the above examples used only two wavelengths with S-CLS imaging, it can be extended to more wavelengths.

Further Algorithmic Modifications

The above-described results demonstrate that very high-quality and very stable tissue spectra can be gathered using the present CEA approach. The present CEA approach can provide a highly accurate DC spectrum as well as a highly accurate AC spectrum. The AC spectrum can be dynamic. For example, for tissue measurements of a human or animal subject, the AC spectrum can include changes in the AC spectrum that can be due to beating of the heart, breathing, or other systematic or intentional motion. The signal-processing and measuring techniques for extracting the concentration of analyte may use multiple aspects of the spectra, including each of the DC spectrum and the AC spectrum. The system can also take into account changes in the optical path length from the measurement of absorption changes—for example, of water—such as to normalize the spectra to better estimate the concentration of the target molecule. The present CEA approach allows for using two or more photodetectors at two different distances from the entry location of the light into the target object. This additional measurement can be used to digitally remove or attenuate effects of skin overlaying a target region, and/or to help allow extraction of both absorption and scattering changes. This additional information can be used to make better predictions that can be independent of the skin color of the subject. The present CEA approach also allows for using very different light source wavelengths and photodetector types, such as to measure tissue in the visible/NIR wavelength region with high sensitivity to hemoglobin as well as high sensitivity to the changes in light scattering properties of tissue, while using the SWIR wavelength window such as to directly measure spectral absorption by a target analyte. These different outputs of spectral processing can be combined, such as within the framework of a metabolic model of the body, such as to help improve estimation of the target analyte or the metabolic state of the subject.

A hierarchy of models that can be used. At the lowest level of the hierarchy, spectral signatures from different wavelength regions can be used to track various physiological parameters—such as $SpO_2$, core body temperature, and glucose. Each one of these parameters can be extracted using techniques that can employ baseline removal, generating relative spectra, and using a physical model of absorption and scattering and the like by taking into account the physical placement of incident light beams and photodetectors. These spectra or extracted spectral parameters can be used to estimate the concentration of the target analyte such as glucose or alcohol, or concentration of hematocrit, etc., such as by using a model that can be derived from correlation with clinical data. The metabolic relationship between different extracted parameters can help reduce errors, such as by using even higher level of reasoning that can be provided by human body model.

Similar techniques can be applied to other fields or use cases, such as can involve inspecting or analyzing meats or plant materials. In gas sensing, tracking multiple spectral features using the present CEA approach can allow the system to separately track gases with closely overlapped spectra or to perform positive identification of a relationship of one gas to another. For example, a breath-based alcohol sensor can measure alcohol's spectral absorption feature at ~3 micrometers of wavelength and can measure $CO_2$ in the breadth at around 4.3 millimeters of wavelength. By "locking" to the breathing pattern of $CO_2$ in the breadth, the component of the alcohol vapor correlated with exhalation can be calculated.

Various Physical Implementations

In practice, various electronic and optical blocks may be combined based on application and form factor requirements. Some of the configurations are discussed below:

(1) The entire processor engine that generates and demodulates, DAC, analog drivers, ADCs with programmable gain amplifier can all be combined into one mixed signal Application Specific Integrated Circuit (ASIC). The external electrical components can include LEDs or electro-optic modulators and photodiodes. Thus, only electrical-to-optical and optical-to-electrical conversion is done externally to ASIC.

(2) For photonic integrated circuits (PIC), the DAC and the drivers for the bank of electro-optic modulators with local feedback from local photodiodes can be integrated on the ASIC chip with only digital communication from the processor to the PIC. The photodiodes may be wire-bonded to a receiver that includes the TIAs, ADC's and demodulators to communicate back to processor with digital response data.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An electronic interface device to an optical system to provide the optical system with electrical signals to control the optical system to produce an illumination combining multiple modulation coded light sources using modulation codes generated by the electronic interface device, and to provide signal conditioning for a photodetector that is included in or coupled to the optical system to receive combined modulated response light and to provide a response signal, including to decode the codes to measure one or more properties of a liquid, gaseous, or other analyte or target, the electronic interface device comprising:
   a multi-channel excitation circuit, including multiple excitation inputs to respectively receive corresponding individually modulated digital electrical excitation input signals and a digital-to-analog converter (DAC) to, in response, respectively provide via corresponding excitation channels corresponding individually modulated analog electrical excitation output signals to respective electrical-to-optical modulators corresponding to the excitation channels, wherein the electrical-to-optical modulators are configured to concurrently provide, in response, individually modulated optical excitation channel illumination signals that are combined into a combined modulated optical output illumination for directing toward the analyte or target;
   a low-noise amplifier, coupled to the photodetector to receive the combined modulated electrical response signal and to provide an amplified combined modulated electrical response signal;
   an analog-to-digital converter (ADC), coupled to the low-noise amplifier to receive the amplified combined modulated electrical response signal and to provide in response a digitized combined modulated electrical response signal; and
   a processor, coupled to the excitation circuit to provide the individually modulated digital electrical excitation input signals in synchronization with a common clock signal, and coupled to the ADC to receive and demodulate the digitized combined modulated electrical response signal in synchronization with the common clock signal to provide demodulated components corresponding to the excitation channels, and configured to analyze at least some of the demodulated components to measure a property of the analyte or target.

2. The electronic interface device of claim 1, wherein the electrical-to-optical modulators are driven by the multi-channel excitation circuit to concurrently provide the individually modulated excitation channel illumination signals, which are orthogonally modulated with respect to each other in terms of at least one of amplitude, phase, or polarization.

3. The electronic interface device of claim 1, including or coupled to:
   a reference photodetector, configured to receive a combined reference component of the combined modulated optical output illumination that is not directed toward and does not interact with the analyte or target, and to transduce the combined reference component into a combined electrical reference component; and
   wherein the ADC is configured to receive and convert the combined electrical reference component into a digital combined electrical reference component; and
   wherein the processor is configured to receive and demodulate the digital combined electrical reference component in synchronization with the common clock signal to provide demodulated reference components corresponding to individual ones of the excitation channels, and to do at least one of:
      (1) adjust modulation of an individually modulated digital electrical DAC input signal of an individual excitation channel based on a demodulated reference component corresponding to that channel; or
      (2) analyze at least some of the demodulated components relative to corresponding demodulated reference components to measure a property of the analyte or target.

4. The electronic interface device of claim 3, comprising:
   a modulation code generator circuit, coupled to the multi-channel excitation circuit to provide respective modulation code input signals to respective inputs of corresponding channels of the multi-channel excitation circuit, wherein the modulation code generator is configured to use feedback from the combined electrical reference component to generate or adjust digital codes provided to the DAC; and
   local feedback circuitry, included in or coupled to corresponding channels of the electrical-to-optical generator, configured to provide individual channel control of an operational parameter of the electrical-to-optical generator on the individual electrical-to-optical generator channel of the multi-channel excitation circuit.

5. The electronic interface device of claim 4, wherein the local feedback circuitry includes wavelength-dependent feedback to provide the individual channel control of the operational parameter of the electrical-to-optical generator on the individual electrical-to-optical generator channel of the multi-channel excitation circuit.

6. The electronic interface device of claim 1, wherein the processor is configured to adjust modulation of an individually modulated digital electrical excitation input signal based on at least one demodulated component corresponding to at least one of the excitation channels.

7. The electronic interface device of claim 1, wherein the photodetector includes multiple photodetectors, respectively corresponding to different receive channels, and wherein the low-noise amplifier includes multiple low-noise amplifiers, respectively corresponding to the different receive channels, and wherein the processor is configured to adjust at least one of: (1) a light source intensity; (2) an amplifier gain; or (3) a photodetector integration time, based on at least one demodulated component corresponding to at least one of the excitation channels.

8. The electronic interface device of claim 1, wherein the device and the optical system are configured to be wearable on a human subject, wherein the processor is configured to analyze at least some of the demodulated components to measure at least one physiological parameter of the subject, the physiological parameter including at least one of blood oxygenation, hematocrit, glucose, lactic acid, alcohol, HbA1c, or temperature using at least one of a measured absorption, a measured transmittance, a measured reflectance, a measured fluorescence, or a measured Raman spectrum based on the received modulated response light.

9. The electronic interface device of claim 1, wherein the device is configured to drive electrical-to-optical modulators that include a light-emitting diode (LED), a super luminescent LED (SLED), or other light-producing electrical-to-optical modulator.

10. The electronic interface device of claim 1, wherein the device is configured to drive a waveguide modulator, a waveguide electro-optic modulator, or other electrical-to-optical modulator modulating light received from a separate light source.

11. The electronic interface device of claim 1, wherein the processor is coupled to the excitation circuit to provide the individually modulated digital electrical excitation input signals, in synchronization with the common clock signal, using corresponding modulation codes that are mapped to specific illumination wavelengths of the combined modulated optical output illumination for directing toward the analyte or target.

12. The electronic interface device of claim 1, wherein the multiple excitation channels are respectively individually coupled to corresponding electrical-to-optical modulators via corresponding analog filter circuits and gain control circuits to reduce noise and harmonics as well as to adjust an output level of the corresponding individually modulated analog electrical output signals for being provided to corresponding ones of the electrical-to-optical modulators.

13. The electronic interface device of claim 12, including a feedback node coupled to the ADC to generate at least one feedback control signal for adjusting at least one of the excitation channels, at least one of the electrical-to-optical modulators, the amplifier, the photodetector, at least one of the analog filter circuits, or at least one of the gain control circuits.

14. The electronic interface device of claim 12, wherein the processor is configured to provide the individually modulated digital electrical excitation input signals in synchronization with the common clock signal, the individually modulated digital electrical excitation input signals including a set of circulant modulation codes, each having a code period divided into multiple time slots for a particular code, wherein one individual excitation channel is "off" in each of the time slots.

15. The electronic interface device of claim 1, wherein the processor is configured to provide the individually modulated digital electrical excitation input signals in synchronization with the common clock signal, the individually modulated digital electrical excitation input signals respectively including alternating first and second code periods respectively having corresponding first and second modulation codes respectively corresponding to time slots making up the first and second code periods, wherein the first and second modulation codes are alike except with opposite phases, and wherein the processor is coupled to the ADC to receive and demodulate the digitized combined modulated electrical response signal in synchronization with the common clock signal to provide demodulated components corresponding to the excitation channels, and configured to detect or attenuate interference based on the modulated electrical response signal corresponding to the first and second modulation codes that are alike except with opposite phases.

16. The electronic interface device of claim 1, comprising at least one of a highpass filter or a bandpass filter in an electrical signal pathway between the amplifier and the ADC to provide AC coupling to utilize dynamic range of the ADC.

17. The electronic interface device of claim 1, comprising a clock generator providing the common clock signal as time-varied for external interference immunity.

18. The electronic interface device of claim 1, wherein the processor is configured to provide the individually modulated digital electrical excitation input signals in synchronization with the common clock signal such that respective modulation functions corresponding to different excitation channels are provided so as to be phase-shifted or phase-scrambled with respect to one another.

19. The electronic interface device of claim 1, wherein the processor is configured to provide the individually modulated digital electrical excitation input signals in synchronization with the common clock signal such that respective modulation functions corresponding to different excitation channels collectively define a code period, providing multiple time slots for a modulation function code, after which the respective modulation functions are repeated, wherein the code period defines a minimum set of sample points, $N_T$, needed to reconstruct spectra using the modulation functions, and wherein the ADC is configured to oversample the amplified combined modulated electrical response signal by a spectral oversampling rate that is greater than an output rate of the DAC.

20. The electronic interface device of claim 19, further comprising a time-domain digital filter, included in or coupled to the processor, for performing time-domain digital filtering of the oversampled amplified combined modulated electrical response signal.

21. The electronic interface device of claim 1, wherein individual ones of the modulation codes are selected for delivery using a scrambled phase condition to provide amplitude consistency to normalize a dynamic range of at least one of receive or transmit componentry.

22. The electronic interface device of claim 1, wherein the low-noise amplifier includes first and second gain stages arranged in series with at least one of a highpass or bandpass filter located between the first and second gain stages.

23. The electronic interface device of claim 22, wherein the at least one of the highpass or bandpass filter includes a highpass pole frequency at a frequency that is less than a lowest modulation frequency of the combined modulated optical output illumination.

24. The electronic interface device of claim 1, wherein a lowest modulation frequency of the combined modulated optical output illumination is just above a 1/f noise corner of electronic componentry used to signal process the combined modulated electrical response signal being received.

25. The electronic interface device of claim 1, wherein the individual modulated digital electrical excitation input signals include pairs of like absolute values of codes that are phase-shifted by 180 degrees to produce opposite signs of the codes in the individual pairs.

26. The electronic interface device of claim 1, wherein the common clock signal is phase-modulated to provide a chirped common clock signal.

27. The electronic interface device of claim 1, wherein the individual modulated digital electrical excitation input signals include circulant modulation at an envelope frequency that is less than a carrier frequency of the individual modulated digital electrical excitation input signals.

28. The electronic interface device of claim 1, wherein the individual modulated digital electrical excitation input signals include at least two different modulation time periods corresponding to different batches of the channels, wherein the channels are batched based on signal-strength or another electrical-to-optical modulation parameter of individual ones of the channels.

29. The electronic interface device of claim 1, wherein the common clock signal is locked to a frame rate of a focal plane array (FPA) serving as the photodetector for providing a hyperspectral image stack.

30. An electronic interface device to an optical system to provide the optical system with electrical signals to control the optical system to produce an illumination combining multiple modulation coded light sources using modulation codes generated by the electronic interface device, and to provide signal conditioning for a photodetector that is included in or coupled to the optical system to receive combined modulated response light and to provide a response signal, including to decode the codes to measure one or more properties of a liquid, gaseous, or other analyte or target, the electronic interface device comprising:

a multi-channel excitation circuit, including multiple excitation inputs to respectively receive corresponding individually modulated digital electrical excitation input signals and a digital-to-analog converter (DAC) to, in response, respectively provide via corresponding excitation channels corresponding individually modulated analog electrical excitation output signals to respective electrical-to-optical modulators corresponding to the excitation channels, wherein the electrical-to-optical modulators are configured to concurrently provide, in response, individually modulated optical excitation channel illumination signals that are combined into a combined modulated optical output illumination for directing toward the analyte or target;

a low-noise amplifier, coupled to the photodetector to receive the combined modulated electrical response signal and to provide an amplified combined modulated electrical response signal;

an analog-to-digital converter (ADC), coupled to the low-noise amplifier to receive the amplified combined modulated electrical response signal and to provide in response a digitized combined modulated electrical response signal; and a processor, coupled to the excitation circuit to provide the individually modulated digital electrical excitation input signals in synchronization with a common clock signal, and coupled to the ADC to receive and demodulate the digitized combined modulated electrical response signal in synchronization with the common clock signal to provide demodulated components corresponding to the excitation channels, and configured to analyze at least some of the demodulated components to measure a property of the analyte or target; and wherein the electronic interface device and the optical system are packaged together to be worn on skin of a human subject to detect at least one of blood oxygenation, hematocrit, glucose, lactic acid, alcohol, HbA1c, or temperature of the subject.

* * * * *